US005988554A

United States Patent [19]

Taka

[11] Patent Number: 5,988,554

[45] Date of Patent: Nov. 23, 1999

[54] DEVICE AND METHOD FOR WINDING DEFLECTION YOKE WITH WIRE

[75] Inventor: Yoshio Taka, Kanagawa, Japan

[73] Assignee: Sony Corporation, Japan

[21] Appl. No.: 08/930,111

[22] PCT Filed: May 10, 1996

[86] PCT No.: PCT/JP96/01238

§ 371 Date: Mar. 16, 1998

§ 102(e) Date: Mar. 16, 1998

[87] PCT Pub. No.: WO96/36063

PCT Pub. Date: Nov. 14, 1996

[30] Foreign Application Priority Data

May 11, 1995 [JP] Japan .................................... 7-113376

[51] Int. Cl.[6] ...................................................... H02K 15/09

[52] U.S. Cl. .................................... 242/433.1; 242/437.3; 242/445.1; 29/605

[58] Field of Search .............................. 242/433.1, 433.2, 242/433.4, 434.8, 434.9, 437.1, 437.3, 443, 444, 445.1, 447, 448; 29/605

[56] References Cited

U.S. PATENT DOCUMENTS

| | | | |
|---|---|---|---|
| 4,027,827 | 6/1977 | Biddison | 242/433.4 X |
| 4,830,297 | 5/1989 | Walton et al. | 242/433.4 |
| 5,360,177 | 11/1994 | Lombardi et al. | 242/433.4 |
| 5,419,503 | 5/1995 | Watanabe et al. | 242/437.3 |
| 5,484,113 | 1/1996 | Watanabe | 242/437.3 |
| 5,573,200 | 11/1996 | Sato et al. | 242/434.8 |
| 5,622,331 | 4/1997 | Kosaka et al. | 242/437.3 |
| 5,794,884 | 8/1998 | Dolgas et al. | 242/433.4 X |
| 5,845,863 | 12/1998 | Takubo et al. | 242/437.1 |

FOREIGN PATENT DOCUMENTS

| | | |
|---|---|---|
| P03-173044 | 7/1991 | Japan . |
| P06-103896 | 4/1994 | Japan . |

*Primary Examiner*—Donald P. Walsh
*Assistant Examiner*—Emmanuel M. Marcelo
*Attorney, Agent, or Firm*—Rader, Fishman & Grauer; Ronald P. Kananen

[57] ABSTRACT

Using a nozzle unit (32), a guide unit (33) and a holder unit (35), the nozzle unit (32) having a nozzle (36) for feeding a flat linear member (W) and positioning mechanism (38) for positioning the nozzle, the guide unit (33) having a guide member (82) adapted to engage and guide the linear member (W) and positioning mechanism (73) for positioning the guide member, the holder unit (35) holding removably the deflection yoke (H) for winding thereon of the linear member (W) and capable of rotating the deflection yoke about the axis of the yoke, the guide member (82) is brought into engagement at a corner portion of a winding path with the linear member (W) fed from the nozzle (36) thereby allowing the linear member to be bent and around the deflection yoke (H) and while the linear member (W) is wound once around the deflection yoke (H), the deflection yoke is rotated 360 degrees about the axis thereof and at the same time the nozzle (36) is rotated in the same direction as the rotating direction of the deflection yoke to prevent excess twist.

6 Claims, 18 Drawing Sheets

DEVICE AND METHOD FOR WINDING DEFLECTION YOKE WITH WIRE

FIELD OF ART

The present invention relates to a winding method and equipment whereby a flat linear member can be wound automatically, without being twisted, around a deflection yoke used in a cathode-ray tube such as Braun tube.

BACKGROUND ART

In winding a linear member around a deflection yoke (also called a bobbin) it is necessary that the linear member be wound orderly along winding grooves formed in the deflection yoke. However, if the linear member used is circular in section, it is dispersed and becomes unstable positionally, thus resulting in that overlap of the linear member is apt to occur. Once there occurs overlap, the winding thickness of the linear member increases and therefore the diameter of the deflection yoke must be increased accordingly, thus causing lose of the deflection efficiency.

In view of the point mentioned above, it has recently been proposed to use a flat linear member having a flat section. In this case, there is used a flat linear member having a width matching the width of each winding groove formed in a deflection yoke, and by merely stacking the linear member at the same place it is possible to wind it around the deflection yoke in an orderly manner without dispersion.

Examples of the flat linear member include such a flat linear member assembly W1 as shown in FIG. 22A, which is obtained by assembling and fusion-bonding linear members 11 of a circular section into a flat shape, and such a flat linear member assembly W2 as shown in FIG. 22B, which is obtained by assembling and fusion-bonding linear members 12 of a square section into a flat shape.

When a linear member is wound round a deflection yoke, a single winding thereof causes the linear member to be twisted once. Winding of a flat linear member is as shown in a conceptual diagram of FIG. 23. As shown therein, when a flat linear member W is wound round a deflection yoke, it is bent at four corner portions and is twisted 90 degrees at each of the corner portions. It follows that one round results in a twist of 360 degrees of the linear member W about its longitudinal axis. This twist gives rise to no special problem in the use of a linear member having a circular section, but must be eliminated in the case of winding a flat linear member in an orderly manner.

Automatic winding of a linear member around a deflection yoke also requires the twist eliminating work.

The present invention has solved the above conventional problem. It is an object of the invention to permit a flat linear member as a deflecting coil to be wound automatically around a deflection yoke without causing twist of the linear member.

It is another object of the present invention to realize automatic winding of a flat linear member in high efficiency and high accuracy without causing twist of the linear member.

It is a further object of the present invention to utilize the equipment and method of the invention for wide-angle deflection or for improving the deflection efficiency of high-frequency scan.

DISCLOSURE OF THE INVENTION

According to the present invention there is provided a winding equipment for a deflection yoke to be used for winding a flat linear member through first and second circumferential grooves formed in the deflection yoke and through winding grooves formed between the first and second circumferential grooves, the winding equipment comprising a nozzle unit, a guide unit and a holder unit, the nozzle unit having a nozzle for feeding the flat linear member, positioning means for positioning the nozzle, and rotating means for rotating and positioning the nozzle at least 180 degrees around the longitudinal axis of the linear member, the guide unit having a guide member adapted to engage and guide the linear member, positioning means for positioning the guide member, and rotating means for rotating the guide member at least 90 degrees to bend the linear member at each corner portion, the holder unit functioning to hold removably the deflection yoke for winding thereon of the linear member and index the deflection yoke around its axis and capable of rotating the deflection yoke in a predetermined certain direction.

According to the present invention there also is provided a winding method for a deflection yoke to wind a flat linear member through first and second circumferential grooves formed in the deflection yoke and through winding grooves formed between the first and second circumferential grooves, the method uses a nozzle unit having a nozzle for feeding the flat linear member and positioning means for positioning the nozzle, a guide unit having a guide member adapted to engage the linear member to guide the linear member and positioning means for positioning the guide member, and a holder unit holding removably the deflecting unit for winding thereon of the linear member and capable of rotating the deflection yoke about its axis, and the method comprises winding the linear member onto the deflection yoke held by the holder unit while allowing the guide member to engage the linear member at each corner portion of a winding path to bend the linear member, and rotating the deflection yoke 360 degrees about its axis and turning the nozzle in the same direction as the rotating direction of the deflection yoke while the linear member is wound once around the deflection yoke, to prevent the linear member from being twisted to excess.

Since the guide member is turned 90 degrees at a corner portion of the winding path, the linear member is twisted 90 degrees and is bent naturally at the corner portion.

When the flat linear member is wound through the first and second circumferential grooves formed in the deflection yoke and through the winding grooves formed between both circumferential grooves, the flat linear member is bent and thereby twisted 90 degrees at each of four corner portions. That is, a one-round winding of the linear member causes a twist of 360 degrees of the linear member about its longitudinal axis. In this case, if the deflection yoke is turned 360 degrees during one-round winding of the linear member, the linear member will be untwisted. At this time, excess twist is prevented by rotating the nozzle in the same direction as the rotating direction of the deflection yoke.

BEST MODE FOR PRACTICING THE INVENTION

The present invention will be described in more detail hereinunder with reference to the accompanying drawings.

Figure 2:
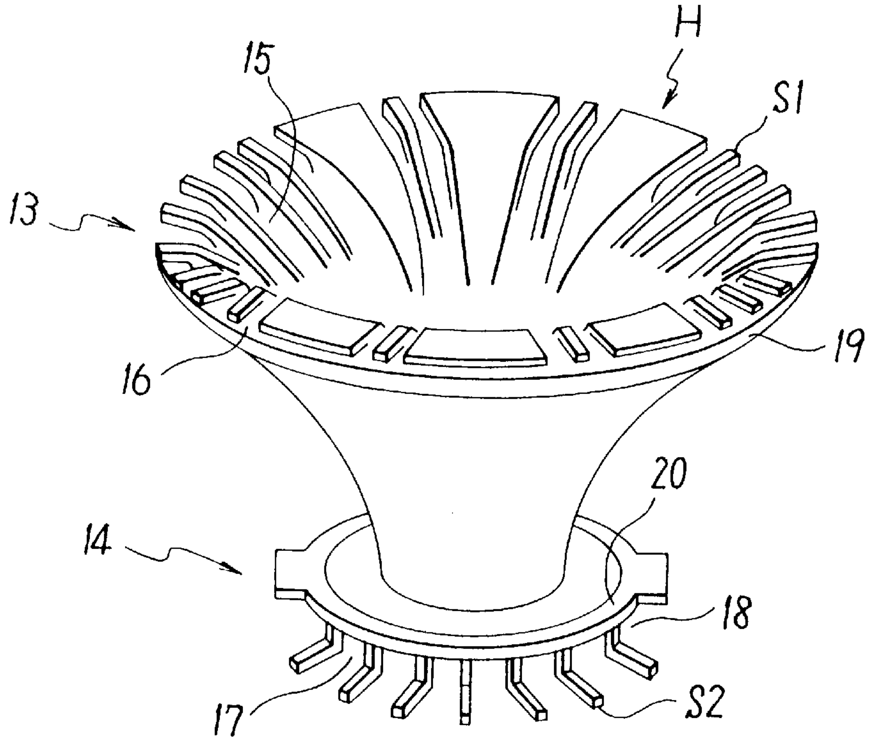
FIG. 2 is a perspective view of a deflection yoke for winding.
Figure 3:
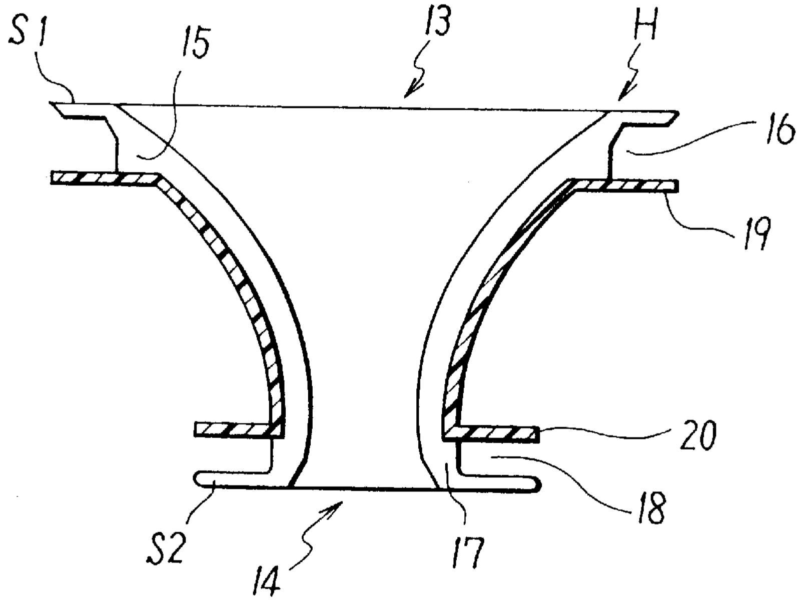
FIG. 3 is a sectional view thereof.

The structure of a deflection yoke will first be described with reference to FIGS. 2 and 3 which are a perspective view and a sectional view, respectively, of the deflection yoke. The deflection yoke, indicated at H, is horn-shaped and has an opening side 13 of a large diameter and a neck side 14 of a small diameter. The deflection yoke H is also called an integral type section deflection yoke or bobbin or separator. It plays the role of a spool used as the core of winding and is formed of a plastic material for example. The deflection yoke H is mounted to a Braun tube in such a manner that its opening side 13 is located on the fluorescent screen side and its neck side 14 is positioned on the electron gun side.

The opening side 13 of the deflection yoke H has a plurality of sections S1, a plurality of winding grooves 15 formed by the sections S1, and a single opening-side circumferential groove (first circumferential groove) 16. Likewise, the neck side 14 of the deflection yoke F has a plurality of sections S2, a plurality of winding grooves 17 formed by the sections S2 and connected to the winding grooves 15, and a single neck-side circumferential groove (second circumferential groove) 18. Further, an opening-side flange 19 and a neck-side flange 20 are projected from the deflection yoke H.

Figure 1:
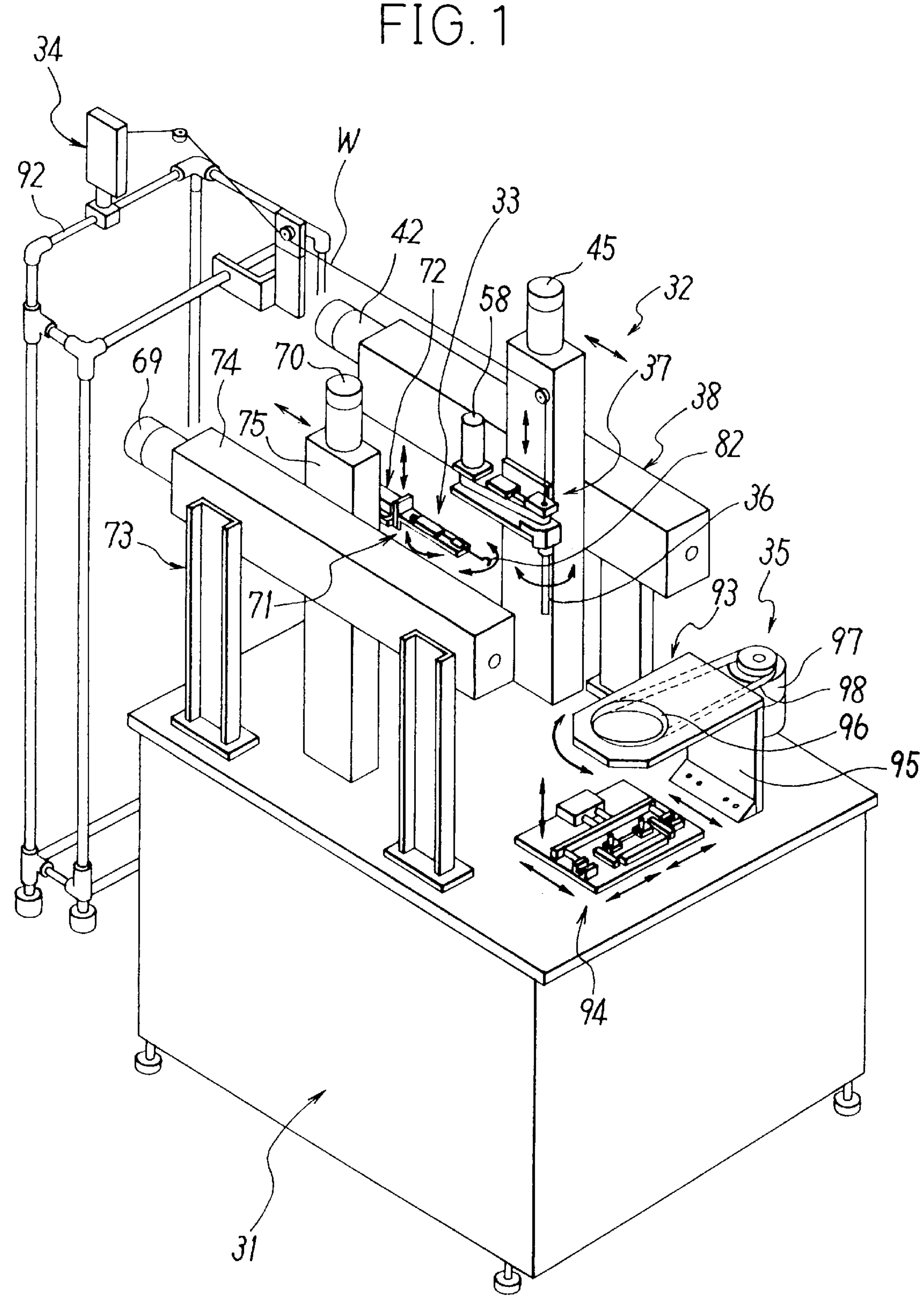
FIG. 1 is a perspective view of a winding equipment according to an embodiment of the present invention.

FIG. 1 is a perspective view of a winding equipment according to an embodiment of the present invention. As shown in the same figure, the winding equipment is provided with a nozzle unit 32 mounted on a base unit 31, a guide unit 33, a tensioner unit 34 and a holder unit 35.

The nozzle unit 32 has a nozzle 36, a nozzle rotating unit 37 as means for rotating and positioning the nozzle 36, and an XZ feed unit 38 as means for positioning the nozzle 36.

Figure 4:
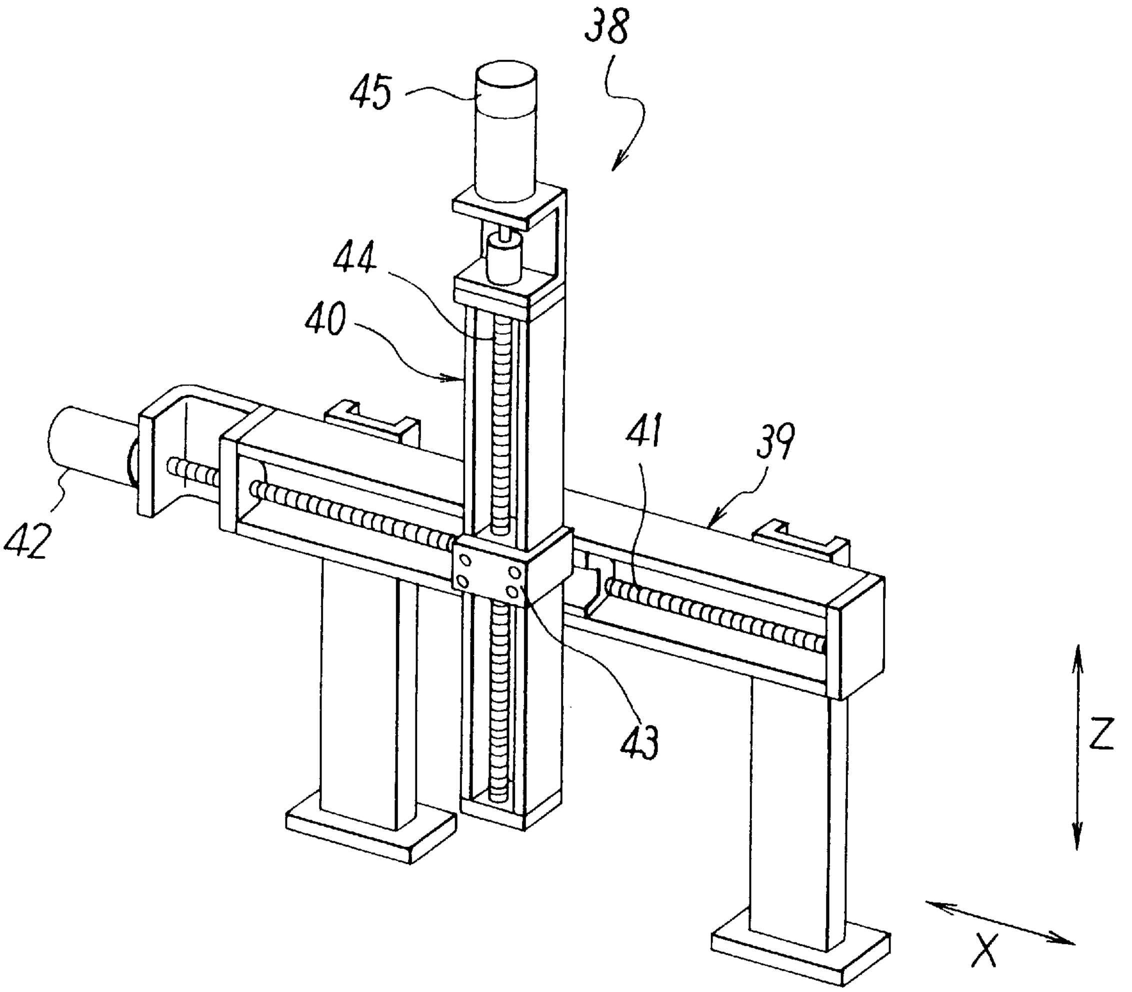
FIG. 4 is a perspective view of an XZ feed unit used in the embodiment.

The XZ feed unit 38, as shown in FIG. 4 which is a perspective view of the same unit, has an X-axis slide unit 39 and a Z-axis slide unit 40. The X-axis slide unit 39 is fixed to the base unit 31, and the Z-axis slide unit 40 is supported by the X-axis slide unit 39 slidably in X-axis direction. A feed screw 41 of the X-axis slide unit 39 is rotated by means of a servo motor 42, whereby the Z-axis slide unit 40 is positioned in X-axis direction. Likewise, a slider 43 is supported by the Z-axis slide unit 40 slidably in Z-axis direction (vertical direction perpendicular to X axis), and a feed screw 44 of the Z-axis slide unit 40 is rotated by means of a servo motor 45, whereby the slider 43 is positioned in Z-axis direction.

The nozzle rotating unit 37 (not shown in FIG. 4) is fixed to the slider 43 and it can be brought into a desired position in the XZ plane by the above-mentioned movements in X- and Z-axis directions. The servo motors 42 and 45 are controlled their operation by an NC section 151 through servo drivers, as will be described later.

Figure 5:
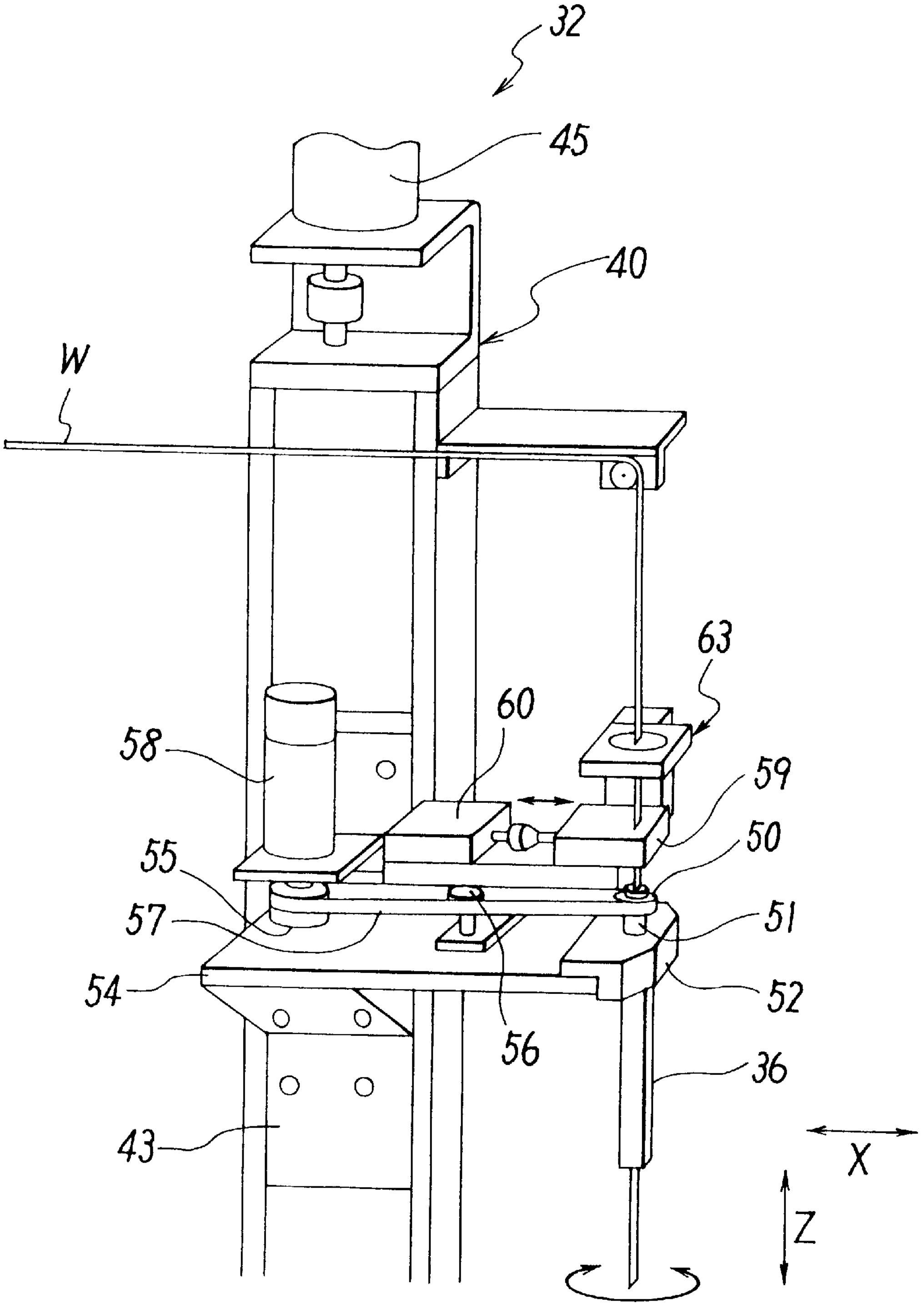
FIG. 5 is a perspective view of a nozzle unit used in the embodiment.
Figure 6:
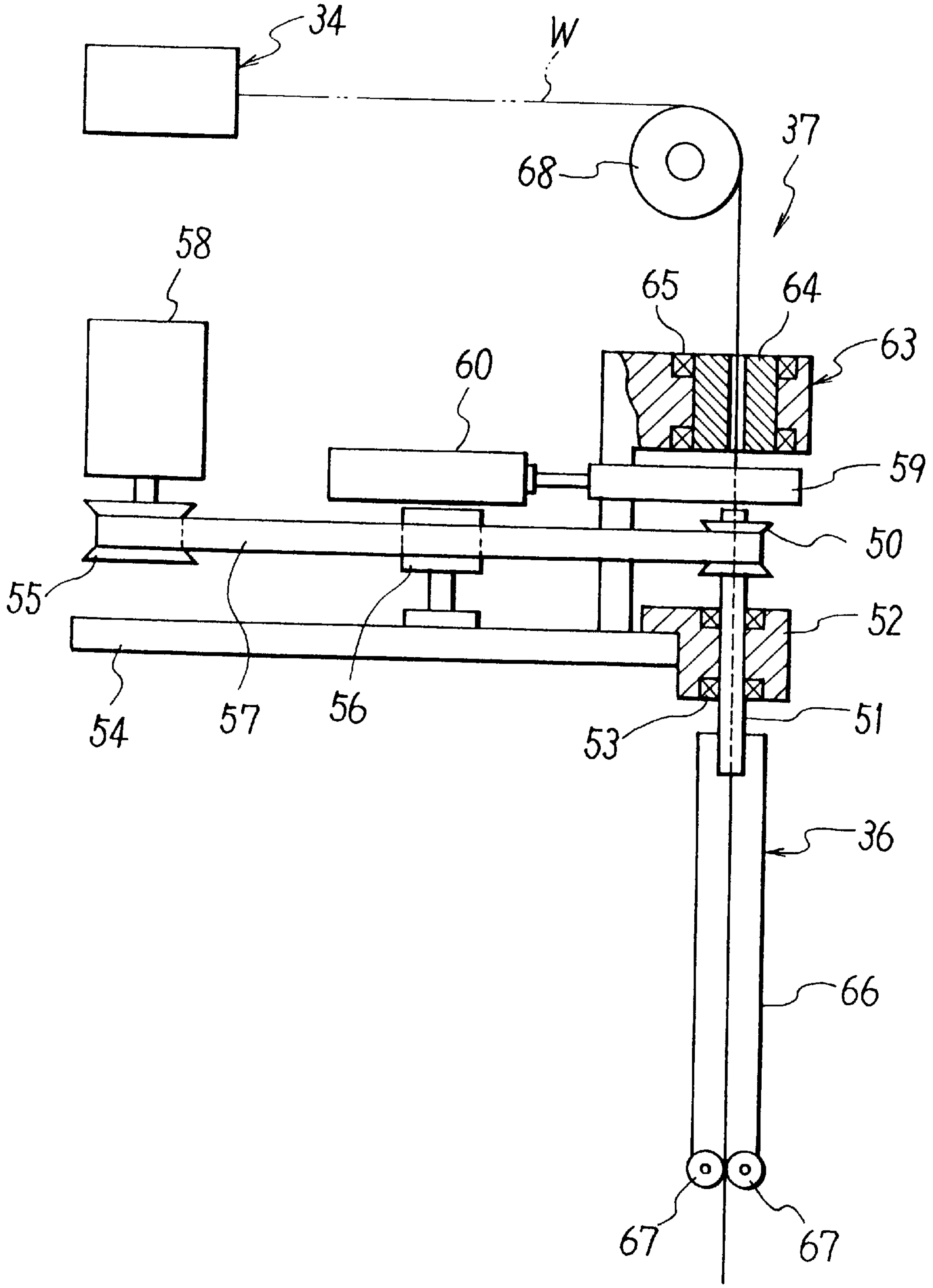
FIG. 6 is a front view of a nozzle rotating unit used in the embodiment.

FIG. 5 is a perspective view of the nozzle unit 32 and FIG. 6 is a front view of the nozzle rotating unit 37. The nozzle unit 32 is for feeding the flat linear member W from the tensioner unit 34 to the deflection yoke H. The nozzle 36 is fixed to a hollow shaft 51, and the shaft 51 is supported rotatably by a slide base 54 through a bearing 53 housed within a bearing housing 52. A toothed belt 57 is entrained on all of a toothed pulley 50 fixed to the shaft 51, a toothed pulley 55 fixed to a servo motor 58 and an idler 56 located at an intermediate position. Upon operation of the servo motor 58 the nozzle 36 can turn in the range of at least 180 degrees about the vertical axis (the longitudinal axis of the linear member W in the nozzle 36).

Figure 7:
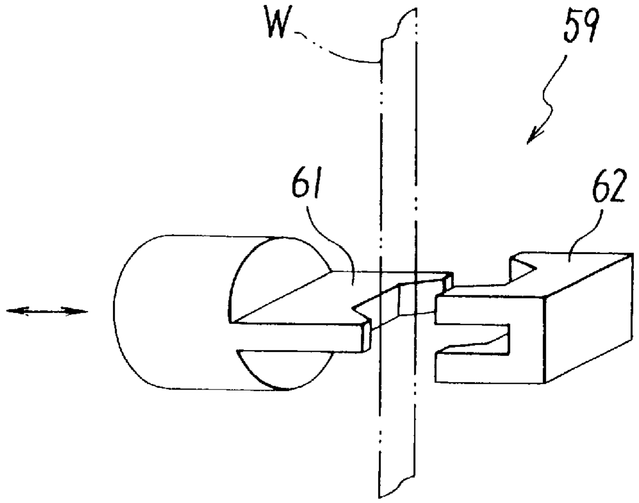
FIG. 7 is a perspective view of a front end portion of a stopper used in the embodiment.

A stopper 59 is for clamping the linear member W in a sandwiching manner before the linear member enters the nozzle 36 when the winding equipment is not in operation. The stopper 59 has a pneumatic cylinder 60 fixed to the slide base 54, a clamp pin 61 and a fixed pin 62 both shown in FIG. 7. The clamp pin 61 is fixed to a piston shaft of the pneumatic cylinder 60. As the piston shaft of the pneumatic cylinder 60 moves forward or backward, the liner member W is sandwiched and clamped between the clamp pin 61 and the fixed pin 62 or is released. The servo motor 58 and the pneumatic cylinder 60 are controlled their operation by the NC section 151 as will be described later.

Above the stopper 59 is disposed a linear member guide unit 63, and a rotating member 64, through which the linear member W is inserted, is supported rotatably by bearings 65, as shown in FIG. 6. According to this construction, the flat linear member W is guided into the nozzle 36 while being rotated in response to the rotation of the nozzle 36.

Figure 8:
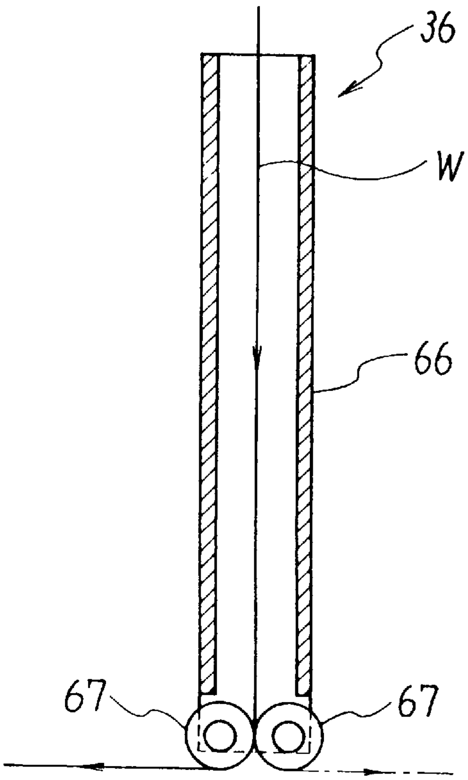
FIG. 8 is a sectional view of a nozzle used in the embodiment.

The nozzle 36, as shown in longitudinal section in FIG. 8, has a hollow rod-like nozzle body 66, with a pair of guide rollers 67 being supported rotatably at the lower end of the nozzle body 66. As shown in FIG. 6, the linear member W fed from the tensioner unit 34 passes a guide pulley 68, then passes through the interior of the linear member guide unit 63 and that of the stopper 59, further through the shaft 51, and enters the nozzle 36. The linear member W now in the nozzle 36 passes through the interior of the nozzle 36 and is sent out to the exterior while being held between the paired guide rollers 67 located at the lower end of the nozzle, as shown in FIG. 8. At this time, the nozzle 36 turns, where by the linear member W is twisted about its longitudinal axis or is untwisted.

Figure 9:
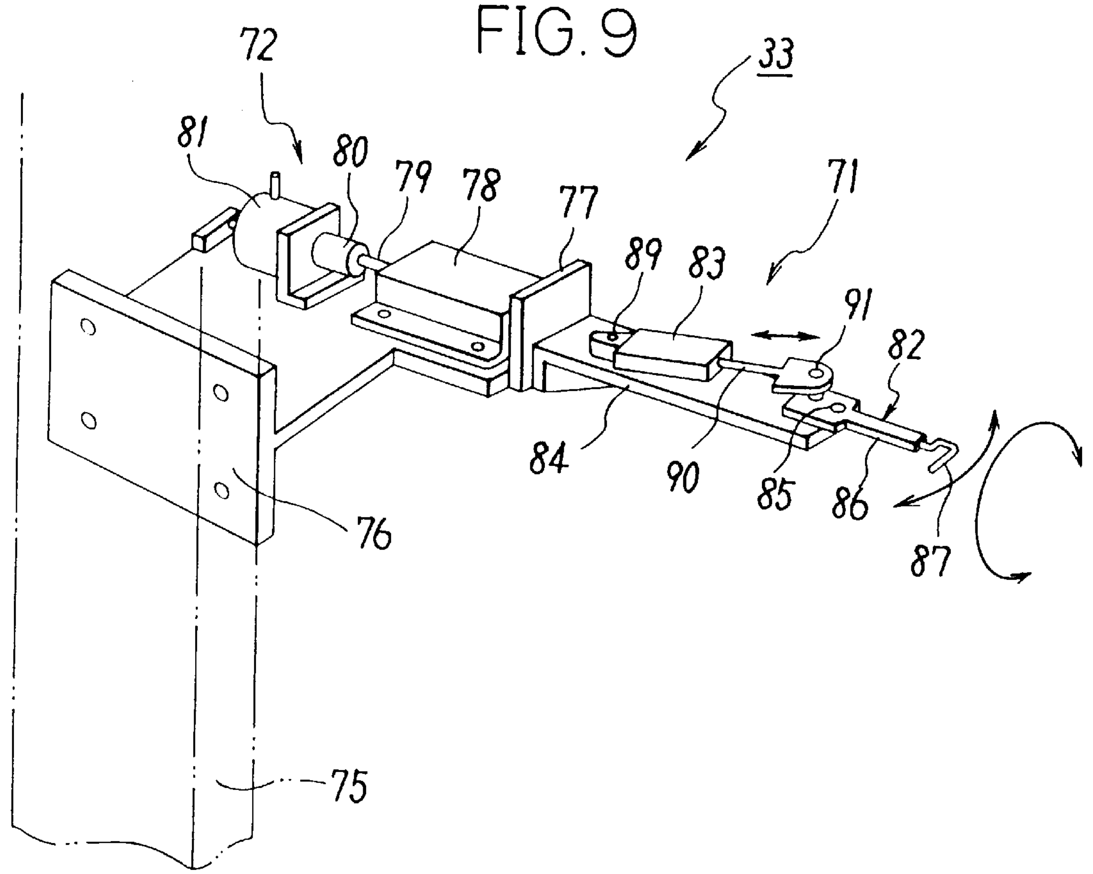
FIG. 9 is a perspective view of a guide unit used in the embodiment.

On the base unit 31, as shown in FIG. 1, the guide unit 33 is disposed in an opposed relation to the nozzle unit 32. As shown in FIG. 9, the guide unit 33 has a guide operating portion 71 for operating a guide member 82, a rotating unit 72 as rotating means for rotating the guide member 82, and an XZ feed unit 73 as positioning means for positioning the guide member 82.

The XZ feed unit 73 is of the same construction as the XZ feed unit 38 of the nozzle unit 32 described previously and it has an X-axis slide unit 74 and a Z-axis slide unit 75. The XZ feed unit 73 can position a slide base 76 (see FIG. 9) of the Z-axis slide unit 75 to a desired position in the XZ plane. Also in this case there are provided servo motors 69 and 70 (see FIG. 1) for moving the slide base 76 in X- and Z-axis directions. The servo motors 69 and 70 are controlled their operation by the NC section 151 through servo drivers as will be described later.

As shown in FIG. 9, the rotating unit 72, which is mounted on the slide base 76, has a rotary base 77, a bearing housing 78, a rotary shaft 79, a coupling 80, and a rotary actuator 81.

The bearing housing 78 is fixed to the slide base 76, and one end of the rotary shaft 79 which is supported rotatably in the bearing housing 76 is fixed to the rotary base 77. The other end of the rotary shaft 79 is connected through the coupling 80 to the rotary actuator 81 which is fixed to the slide base 76. Therefore, the rotary base 77 is rotated by operation of the rotary actuator 81. The rotary actuator 81 is a pneumatic actuator and is controlled its operation by the NC section 151.

The guide operating portion 71 of the guide unit 33 has a guide member 82, a drive cylinder 83 and a base 84. The base 84 is fixed to the rotary base 77 of the rotating unit 72.

Figure 10:
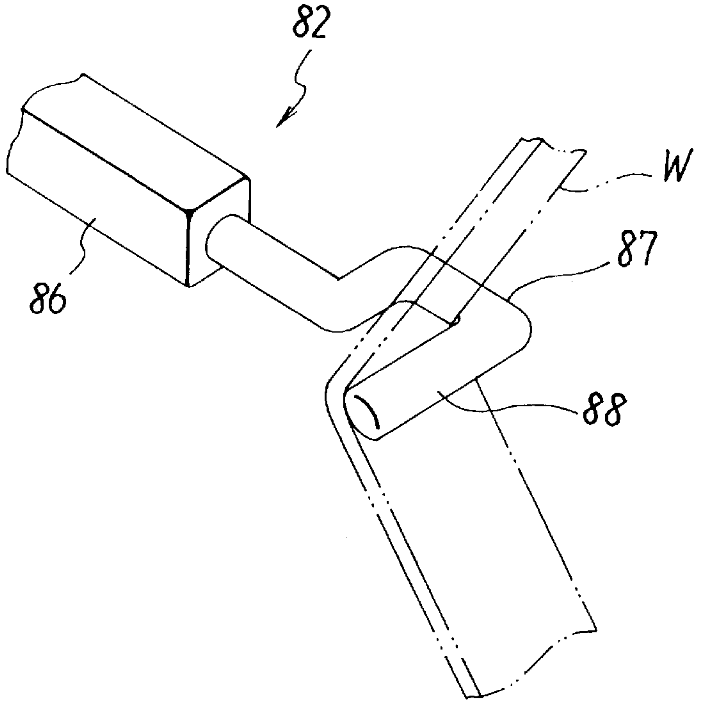
FIG. 10 is a perspective view of a front end portion of a guide member used in the embodiment.

The guide member 82 is adapted to engage the linear member W to guide the linear member. As shown in FIG. 9, the guide member 82 is supported on the base 84 pivotably through a pin 85. At a front end of a stem portion 86 of the guide member 82 is formed a turned square U-shaped hook 87. As shown in FIG. 10, the hook 87 has a linear guide bar 88 having a length approximately equal to the width of the flat linear member W. The guide bar 88 is positioned so that the axis of the stem portion 86 intersects substantially the center of the guide bar length at right angles.

The drive cylinder 83 is supported at the rear portion thereof by the base 84 pivotably through a pin 89, and the front end of a piston shaft 90 is connected to the base end portion of the guide member 82 pivotally with a pin 91.

As the piston shaft 90 of the drive cylinder 83 advances, the guide member 82 moves pivotally around the pin 85 in the clockwise direction in FIG. 9 and assumes an operating position (the position shown in FIG. 9) in which it is straight in the longitudinal direction of the base 84. In this state, the stem portion 86 of the guide member 82 is substantially coaxial with the rotary shaft 79. On the other hand, as the piston shaft 90 of the drive cylinder 83 retreats, the guide member 82 moves pivotally in the counterclockwise direction and the hook 87 assumes a position retracted from the axis of the rotary shaft 79. The drive cylinder 83 is also controlled its operation by the NC section 151 as will be described later.

The nozzle 36 of the nozzle unit 32 and the guide member 82 of the guide unit 33 can be moved and positioned without mutual interference in substantially the same XZ plane.

As shown in FIG. 1, the tensioner unit 34 is, mounted on a frame 92. The linear member W enters the tensioner unit 34 from a linear member supply source (not shown) and is thereby given an appropriate tension mechanically, then is fed to the nozzle unit 32.

Now, a description will be given of the holder unit 35. The holder unit 35 holds removably and indexes the deflection yoke H shown in FIG. 2 and can rotate the deflection yoke in a certain direction for untwisting the linear member W. As shown in FIG. 1, the holder unit 35 is positioned in front of the nozzle unit 32 and the guide unit 33 which are opposed to each other.

The holder unit 35 has a holder body 93 for clamping the deflection yoke H and positioning it to a desired rotational angle position and a clamp opening/closing device 94 disposed below the holder body 93 to open and close a clamp portion 102 of the holder body 93.

As shown in FIG. 1, the holder body 93 has an annular rotary table 96 supported rotatably by a support plate 95 of L-shaped section which is erected on the base unit 31. The rotary table 96 is connected to a rotating shaft of a servo motor 97 through a toothed belt 98 and can be positioned to a desired rotational angle position by operation of the servo motor 97. The servo motor 97 is also controlled its operation by the NC section 151 via a servo driver as will be described later.

Figure 11:
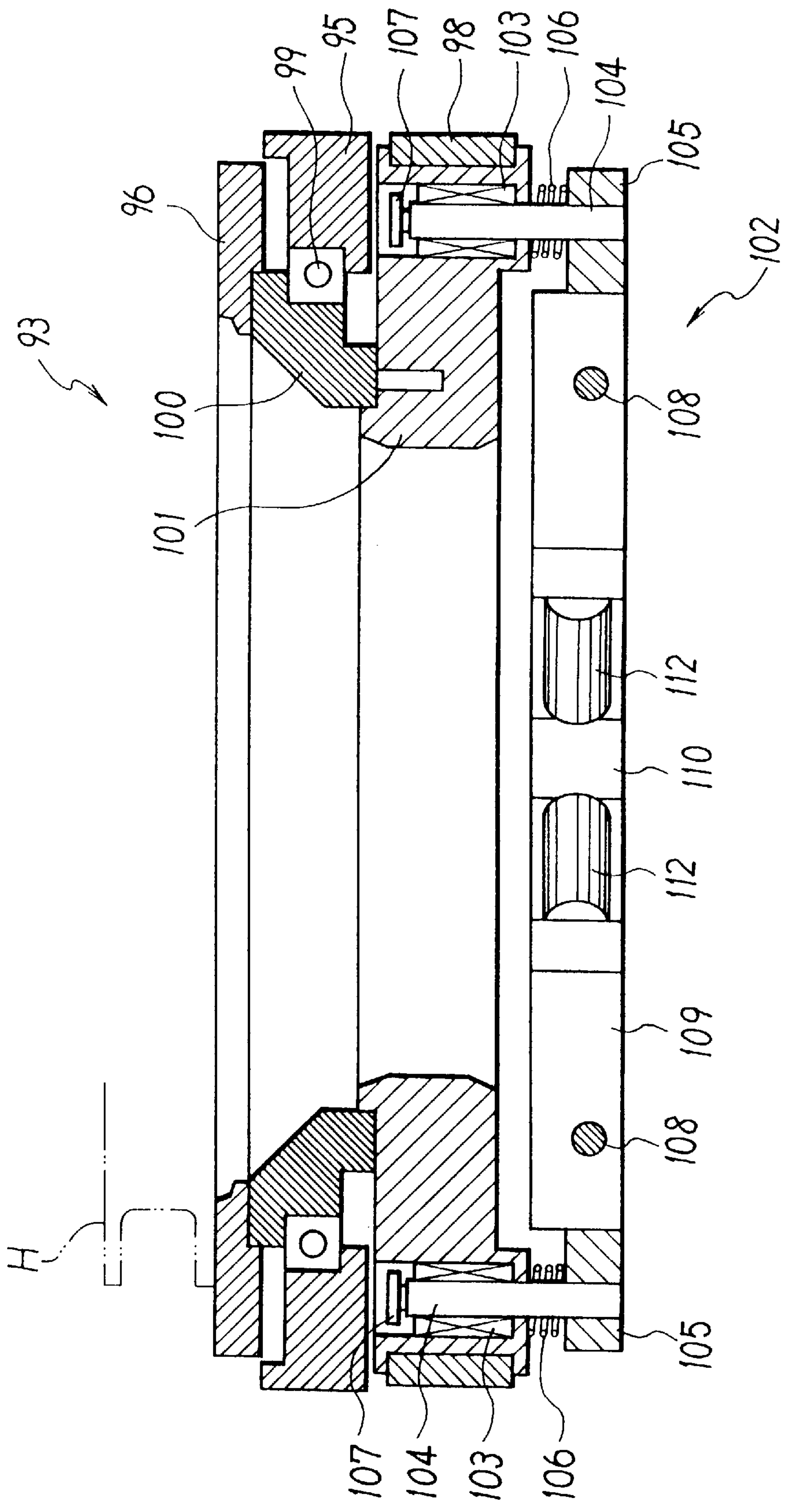
FIG. 11 is a sectional view of a holder body used in the embodiment.

FIG. 11 is a sectional view of the holder body 93. As shown in the same figure, a rotary ring 100 is supported by the support plate 95 rotatably through a bearing 99, and the rotary table 96 for carrying the deflection yoke H thereon is fixed onto the upper surface of the rotary ring 100. A toothed pulley 101 is fixed to the lower surface of the rotary ring 100, and the toothed belt 98 connected to the servo motor 97 is engaged with the toothed pulley 101. On the lower surface side of the toothed pulley 101 is disposed a clamp portion 102 for clamping the deflection yoke H removably.

Direct-acting bearings 103 are fitted in two holes formed in the toothed pulley 101, and connecting shafts 104 of the clamp portion 102 are respectively inserted through the bearings 103 slidably, whereby the clamp portion 102 is connected to the toothed pulley 101. Therefore, upon operation of the servo motor 97, the clamp portion 102 is also rotated and positioned together with the rotary table 96 through the toothed pulley 101.

A clamp spring 106, which is wound round each connecting shaft 104, is positioned between each of fixing plates 105 for fixing the connecting shaft 104 and the toothed pulley 101. The clamp portion 102 is urged downward at all times by virtue of the clamp spring 106. A stopper 107 is projected from the upper end of each connecting shaft 104. The lower-end position of the connecting shaft 104 is restricted by abutment of the stopper with an end portion of the associated direct-acting bearing 103.

Figure 12:
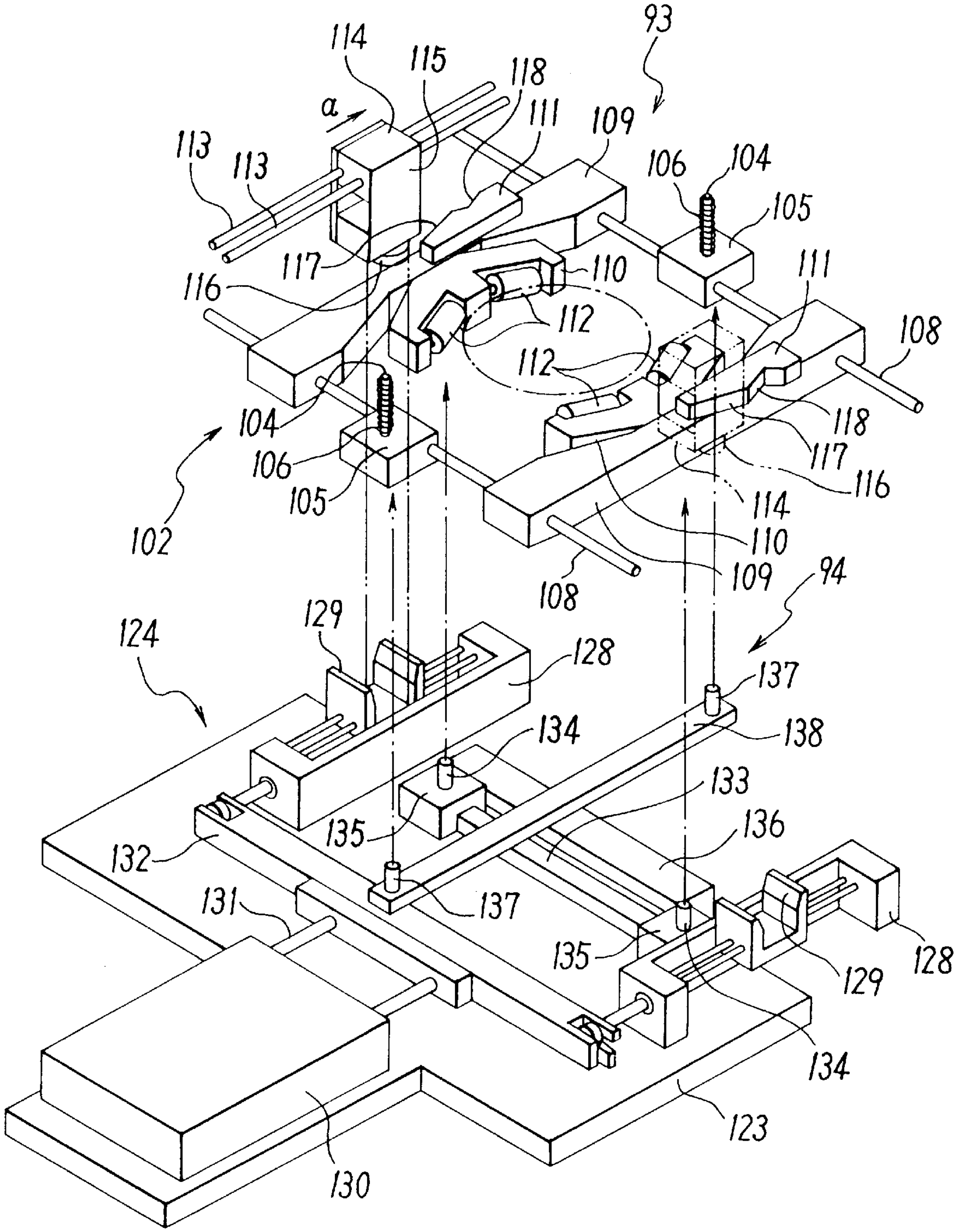
FIG. 12 is a perspective view of a clamp portion and a clamp opening/closing portion both used in the embodiment.

FIG. 12 is a perspective view of the clamp portion of the holder body 93 and an opening/closing portion 124 of the clamp opening/closing device 94. As shown in the same figure, the two fixing plates 105 are connected to the toothed pulley 101 through the connecting shafts 104 and they support guide shafts 108. The guide shafts 108 are spaced in parallel from each other. A pair of support bases 109 are slidably supported by the guide shafts 108 so as to straddle both guide shafts 108 and movably toward and away from each other. A roller mount 110 and a cam plate 111 are fixed to each support base 109.

Two rollers 112 are supported rotatably by each roller mount 110 in such a manner that a total of four rollers 112 are positioned on a circumference and come into abutment with the outer peripheral surface of the deflection yoke H. Rotating shafts of the two rollers 112 on each roller mount 110 are inclined in V shape with respect to each other so as to contact the outer peripheral surface of the deflection yoke H and effect positioning of the yoke.

Outside each support base 109 a pair of guide shafts 113 (a pair of guide shafts 113 on one side are not shown in FIG. 12) extend in a direction orthogonal to the guide shafts 108 and are supported by the toothed pulley 101 through support means (not shown). A plate spring slider 114 is mounted slidably to the guide shafts 113, and a cam follower 116 is fixed to the plate spring slider 114 through a plate spring 115. The cam follower 116 is adapted to engage the cam plate 111 which is fixed to the support base 109.

The cam plate 111 has an inclined cam surface 117 of a gradually increasing cam lift and a retaining cam surface 118 of a V-shaped section. When the plate spring slider 114 is located on this side of the cam plate 111 in FIG. 12 and when it is moved in the direction of arrow "a" along the guide shafts 113, the cam follower 116 comes into abutment with the inclined cam surface 117 of the cam plate 111. Then, with the movement of the plate spring slider 114, the cam plate 111 and the support base 109 move inwards (in the direction in which both support bases 109 approach each other). With further movement of the plate spring slider 114, the cam follower 116 gets in the retaining cam surface 118 of the cam plate 111 and is retained there.

When the deflection yoke H is interposed between the rollers 112 of both support bases 109, the rollers 112 abut the deflection yoke H to restrict the movement of the yoke as long as each cam follower 116 is fitted in the associated retaining cam surface 118. In this state, the plate springs 115 are deflected and their biasing forces cause the rollers 112 to be urged against the deflection yoke H (see FIG. 13).

Figure 14:
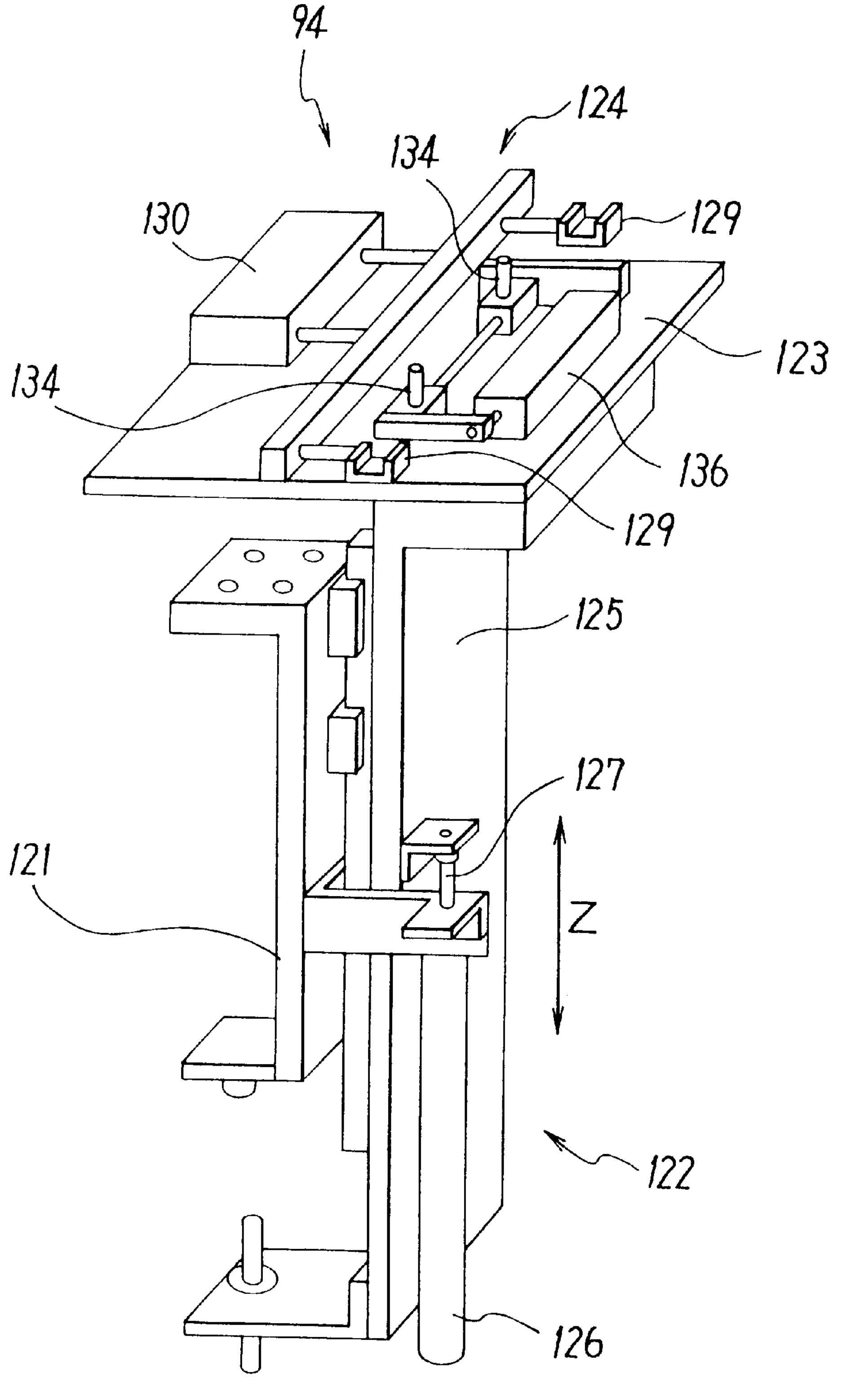
FIG. 14 is a perspective view of a clamp opening/closing device used in the embodiment.

On the other hand, FIG. 14 is a perspective view of the clamp opening/closing device 94. As shown in the same figure, the clamp opening/closing device 94 is provided with a fixed portion 121, a vertical moving unit 122, a rising table 123, and an opening/closing portion 124.

The fixed portion 121 is fixed to the base unit 31 shown in FIG. 1. The vertical moving unit 122 has a moving plate 125 which is supported by the fixed portion 121 so as to be slidable vertically (in the Z-axis direction), and a cylinder 126 which is fixed to the fixed portion 121. A piston shaft 127 of the cylinder 126 is fixed to the moving plate 125. The rising table 123 is fixed to the upper end of the moving plate 125 and faces the upper surface of the base unit 31. The opening/closing portion 124 is mounted on the rising table 123. Therefore, as a piston shaft 127 of the cylinder 126 extends, the rising table 123 and the opening/closing portion 124 rise a predetermined distance in the Z-axis direction together with the moving plate 125 and are positioned. The cylinder 126 is controlled its operation by the NC section 151 which will be described later.

In the opening/closing portion 124 mounted on the rising table 123, as shown in FIG. 12, a pair of linear guides 128 for holding levers are fixed onto the rising table 123, and holding levers 129 are supported slidably by the linear guides 128. When the toothed pulley 101 is indexed to a predetermined mounting/removing position (the state shown in FIG. 12), the linear guides 128 assumes positions under the guide shafts 113 of the plate spring sliders 114 to guide the holding levers 129 in a direction parallel to the moving direction of the sliders 114.

A holding lever drive cylinder 130 is fixed to the rising table 123. Piston shafts 131 of the drive cylinder 130 are connected through a connecting rod 132 to the holding levers 129 located on both sides. As the piston shafts 131 advance or retreat, the holding levers 129 located on both sides move together with the linear guides 128 while being guided by the linear guides.

The holding levers 129 are each turned square U-shaped in section which is open upward so that the lower portion of the plate spring slider 114 can be fitted inside the turned square U-shape removably. By operation of the drive cylinder 130 the holding levers 129 are moved along the linear guides 128 in accordance with the position of the plate spring sliders 114, and the rising table 123 is raised a predetermined distance, whereby the lower portions of the sliders 114 are respectively fitted in the holding levers 129. When the holding levers 129 are moved in this state by means of the drive cylinder 130, the plate spring sliders 114 also move. The drive cylinder 130 is controlled its operation by the NC section 151 which will be described later.

On the rising table 123, a linear guide 133 for actuator pins is fixed between the paired linear guides 128, the linear guide 133 extending in a direction orthogonal to the linear guides 128. Sliders 135 with actuator pins 134 fixed thereto are supported slidably by the linear guide 133. Further, an actuator pin drive cylinder 136 is fixed to the rising table 123 in an adjacent relation to the linear guide 133. Both sliders 135 are connected to the drive cylinder 136 and are moved in directions approaching or leaving each other by operation of the drive cylinder 136. When the toothed pulley 101 is indexed to a predetermined mounting/removing position (the state shown in FIG. 12), both sliders 135 are respectively positioned under the support bases 109 and move in parallel with the moving direction of the support bases.

Recesses (not shown) for fitting therein of both actuator pins 134 removably are formed in the lower surfaces of both support bases 109. By operation of the drive cylinder 136 the sliders 135 are moved along the linear guide 133 in accordance with the position of the support bases 109. When the rising table 123 is raised a predetermined distance, the actuator pins 134 fixed to the sliders 135 get into the recesses formed in the support bases 109. As the sliders 135 are moved by means of the drive cylinder 136, the support bases 109 move in directions approaching or leaving each other. The drive cylinder 136 is controlled its operation by the NC section 151 which will be described later.

To the rising table 123 is fixed a spring pusher 138 with pushpins 137 fixed to both ends thereof. When the toothed pulley 101 is indexed to a predetermined mounting/removing position, both push pins 137 are respectively positioned under the fixing pins 105. When the rising table 123 is raised a predetermined distance, the push pins 137 come into abutment with the bottoms of the fixing plates 105 and cause the fixing plates (clamp portion 102) to rise against the biasing force of the clamp springs 106.

Figure 13:
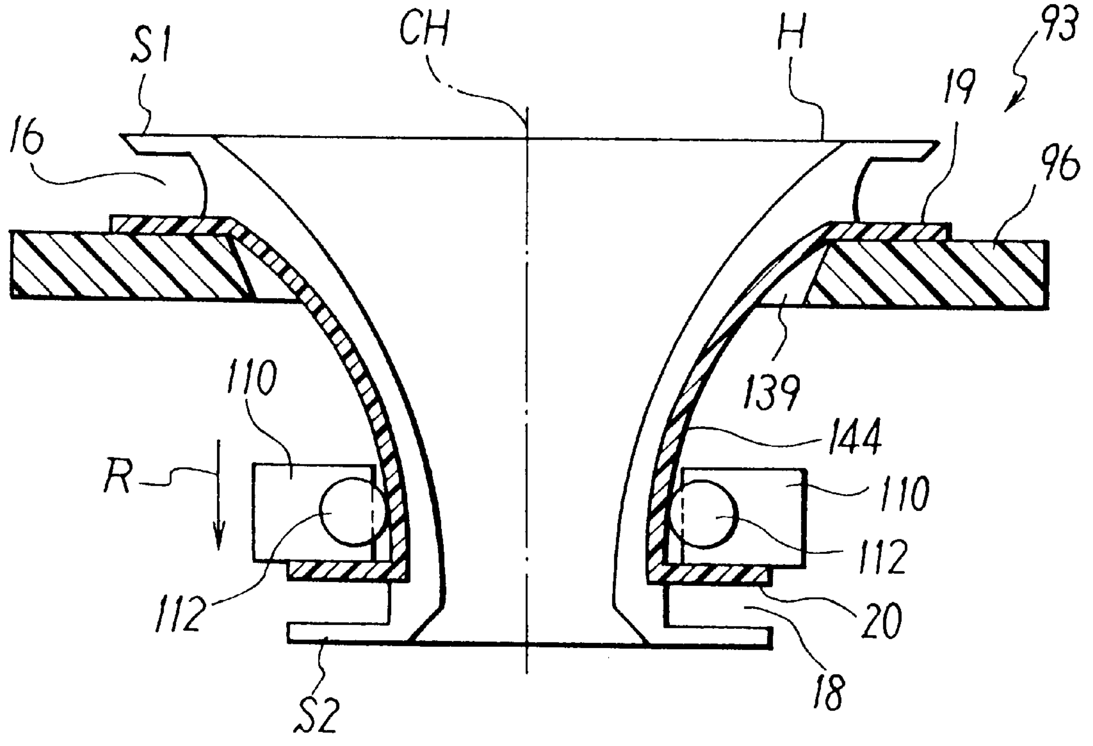
FIG. 13 is a sectional view showing a clamped state of the deflection yoke in the embodiment.

As shown in FIG. 13 which represents a clamped state of the deflection yoke H, the deflection yoke has the opening-side flange 19 and the neck-side flange 20. The deflection yoke H is inserted into a hole 139 formed in the rotary table 96 of the holder body 93, and the lower surface of the opening-side flange 19 is placed on the peripheral edge of the rotary table 96. The size of the hole 139 is set so that the neck-side flange 20 can pass therethrough. A lug (not shown) is formed on the rotary table 96 at a position near the flange 19 and it is fitted in a recess formed in the opening-side flange 19 to restrict the rotation of the rotary table 96.

The deflection yoke H is mounted to the holder body 93 in the following manner. When the deflection yoke H is to be inserted into the rotary table 96, both support bases 109 are moved away from each other in advance so that the four rollers 112 are retracted up to positions not interfering with the neck-side flange 20. As to the plate spring sliders 114, they are retracted up to positions where the cam followers 116 do not contact the cam plates 111. These retracting motions are performed respectively by operation of the actuator pins 134 and that of the holding levers 129 in the opening/closing portion 124.

In this state the deflection yoke H is inserted into the rotary table 96. Subsequently, the rising table 123 is raised, so that the fixing plates 105 are pushed up with push pins 137 of the pusher 138, whereby the whole of the clamp portion 102 is raised relative to the rotary table 96. As a result, the lower surfaces of the roller mounts 110 are positioned higher than the neck-side flange 20 of the deflection yoke H. At the same time, the holding levers 129 are fitted on the plate spring sliders 114, and the actuator pins 134 get into the recesses formed in the lower surfaces of the support bases 109.

Next, the support bases 109 are moved toward each other by the actuator pins 134, and the plate spring sliders 114 are moved by the holding levers 129, allowing the cam followers 116 to get in the retaining cam surfaces 118 of V-shaped section of the cam plates 111. Thereafter, the rising table 123 is moved down, thus causing the push pins 137 to move away from the fixing plates 105, with the result that the clamp portion 106 is pushed down in the direction of arrow R in FIG. 13 by virtue of the clamp springs 106, and the roller mounts 110 are abutted against the flange 20 and urge it downward. At the same time, the holding levers 129 and the actuator pins 134 move respectively away from the plate spring sliders 114 and the support bases 109. Now, the clamping for the deflection yoke H is completed.

In the clamped state as shown in FIG. 13, the rotary table 96 and the roller mounts 110 come into abutment respectively with the flanges 19 and 20 of the deflection yoke H and are urged in directions away from each other by means of the clamp springs 106 and are thereby positioned in the vertical direction (central axis CH of the deflection yoke H, the first direction). Further, the four rollers 112 come into pressure contact with an outer peripheral portion 144 of the deflection yoke H in four directions to effect positioning in the horizontal direction (the second direction) orthogonal to the central axis CH.

After the deflection yoke H has been clamped as described above, the opening/closing portion 124 of the clamp opening/closing device 94 leaves the clamp portion 102 of the holder body 93, so that the deflection yoke H can be positioned to a desired angular position by operating the servo motor 97 to rotate the rotary table 96.

Since the four rollers 112 are arranged so that V shape is defined by each of two sets of rollers, all the rollers 112 can contact the outer peripheral surface of the deflection yoke H. The reason why four rollers 112 are used is that it is intended to uniform deformations induced by a large clamping force in the case where the deflection yoke H is made of a synthetic resin. Basically, therefore, it suffices to use a total of three rollers which are a pair of rollers arranged in V shape and one roller opposed thereto. For example, where the deflection yoke H is larger in size and its cylindrical portion is large in diameter and small in wall thickness, there may be used five or more rollers.

For removing the deflection yoke H from the holder body 93 there is adopted a procedure reverse to the procedure described above. That is, the clamp portion 102 is raised with push pins 137 to disengage the roller mounts 110 and the flange 20 from each other, then the support bases 109 are moved away from each other with actuator pins 134, and the plate spring sliders 114 are moved by the holding levers 129, allowing the cam followers 116 to be disengaged from the cam plates 111. As a result, the deflection yoke H becomes free and can be removed from the rotary table 96.

Figure 15:
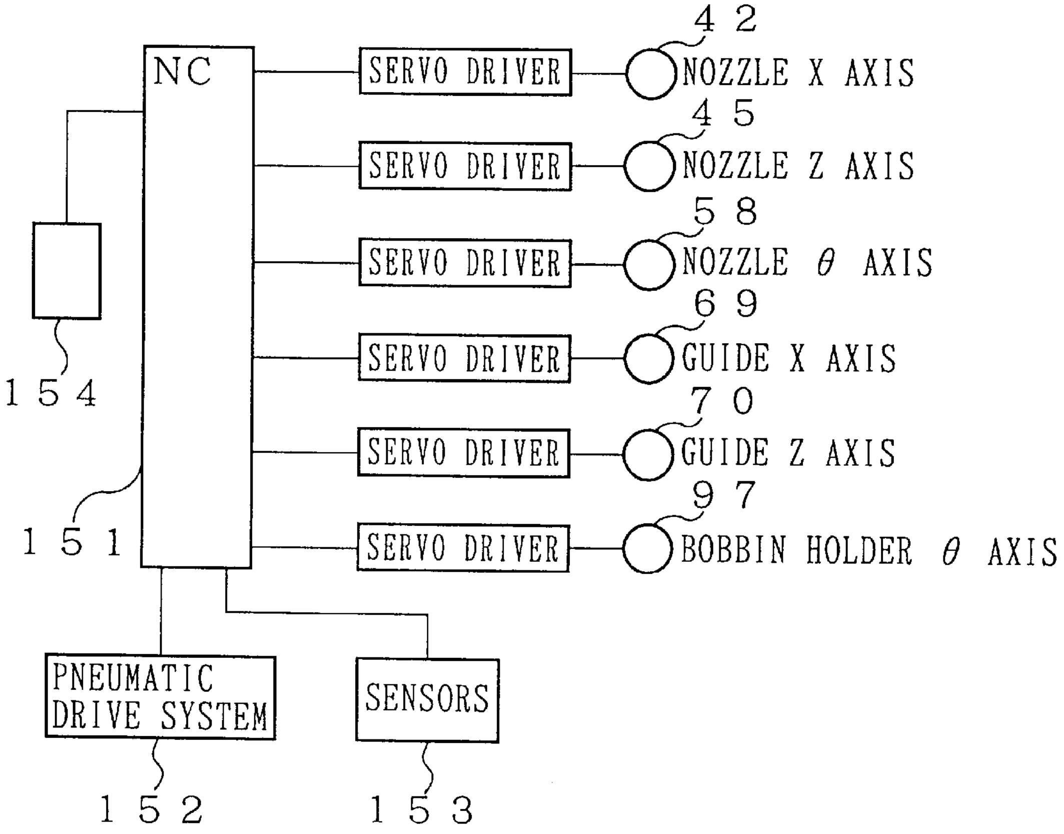
FIG. 15 is a block diagram showing a control system used in the embodiment.

Further, the servo motors 42,45 and 58 in the nozzle unit 32, the servo motors 69 and 70 for XZ movement in the guide unit 33, and the servo motor 97 for rotation in the ho der unit 35, are numerically controlled by the NC section 151 respectively through lines and servo drivers, as shown in FIG. 15.

The cylinders 60, 83, 126, 130, 136 and rotary actuator 81 in the above units are numerically controlled through a pneumatic drive system 152 also by using outputs from the NC section 151. The operations of the cylinders 60, 57, 80, 114, 119 and rotary actuator 81 are detected by sensors 153 provided respectively for them, and the detected signals are fed back to the NC section 151.

To the NC section 151 are inputted NC data beforehand from a teaching unit 154 to control the winding operations required. The NC data thus inputted can be changed their parameters by inputting modification data from the teaching unit 154, whereby the change of NC data to cope with a change in type of a deflection yoke for winding a linear member thereon can be done easily.

Figure 16:
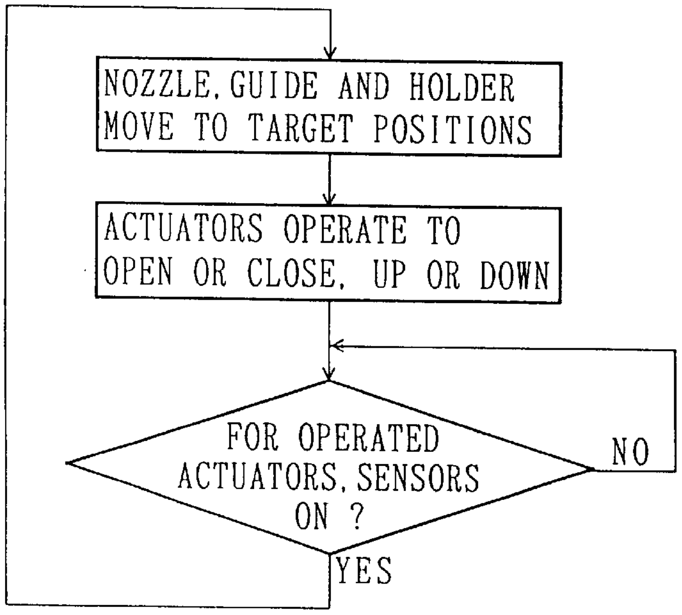
FIG. 16 is a flow chart showing operations of the control system used in the embodiment.

In the NC section 151 of the above construction, as shown in the flow chart of FIG. 16, the nozzle unit 32, guide unit 33 and holder unit 35 are moved to their target positions by controlling the associated servo motors appropriately, and their cylinders are operated to drive the clamp portion 102, guide member 82, etc. When the sensors associated with those cylinders have detected that the operations of the cylinders were carried out surely, the operations of the cylinders are stopped. The operations required are now completed.

Although in the above illustrated embodiment the plate spring sliders 114 shown in FIG. 12 are used for generating the clamping force of the rollers 112, the plate spring sliders 114 may be substituted by, for example, compression springs or tension springs. Likewise, the toothed belt 98 and pulley 101 used for rotating the deflection yoke H together with the rotary table 96 may be substituted by gears or friction wheels. Further, there may be adopted a direct drive using a special motor provided with a hollow rotor which correspond, to the pulley 101.

Although in the above embodiment the servo motors and cylinders are numerically controlled by the NC section 151, this constitutes no limitation. The control may be made by any other similar means, for example, by a combination of sequencer and AC servo motor or a combination of CPU and robot controller.

Figure 23:
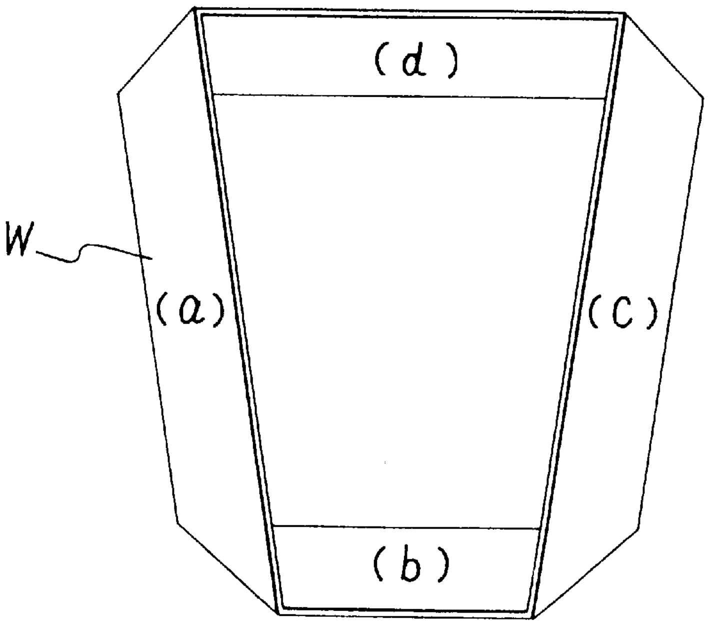
FIG. 23 is a conceptual diagram showing in what state a flat linear member is wound round a deflection yoke.

Description is now directed to an example of a method for winding the flat linear member W around the deflection yoke H, using the winding equipment described above. Along the winding path the linear member W passes one section S1 on the opening side 13 of the deflection yoke H shown in FIG. 2, then passes through the winding grooves 15 and 17 and reaches section S2 on the neck side 14 [(a) in FIG. 23]. Next, the linear member W is bent at a corner portion, passes the neck-side circumferential groove 18 and is wound up to the next section S2 on the neck side 14 [(b) in FIG. 23]. Then, the linear member W is bent at a corner portion, passes the section S2 and further through the winding grooves 15 and 17 and reaches section S1 on the opening side [(c) in FIG. 23]. Next, the linear member W is bent at a corner portion, passes the opening-side circumferential groove 16 and returns to the original section S1 [(d) in FIG. 23]. Further, the linear member W is bent at a corner portion and returns to the initial position. By repeating this cycle the linear member W is wound round the deflection yoke H.

Figure 17:
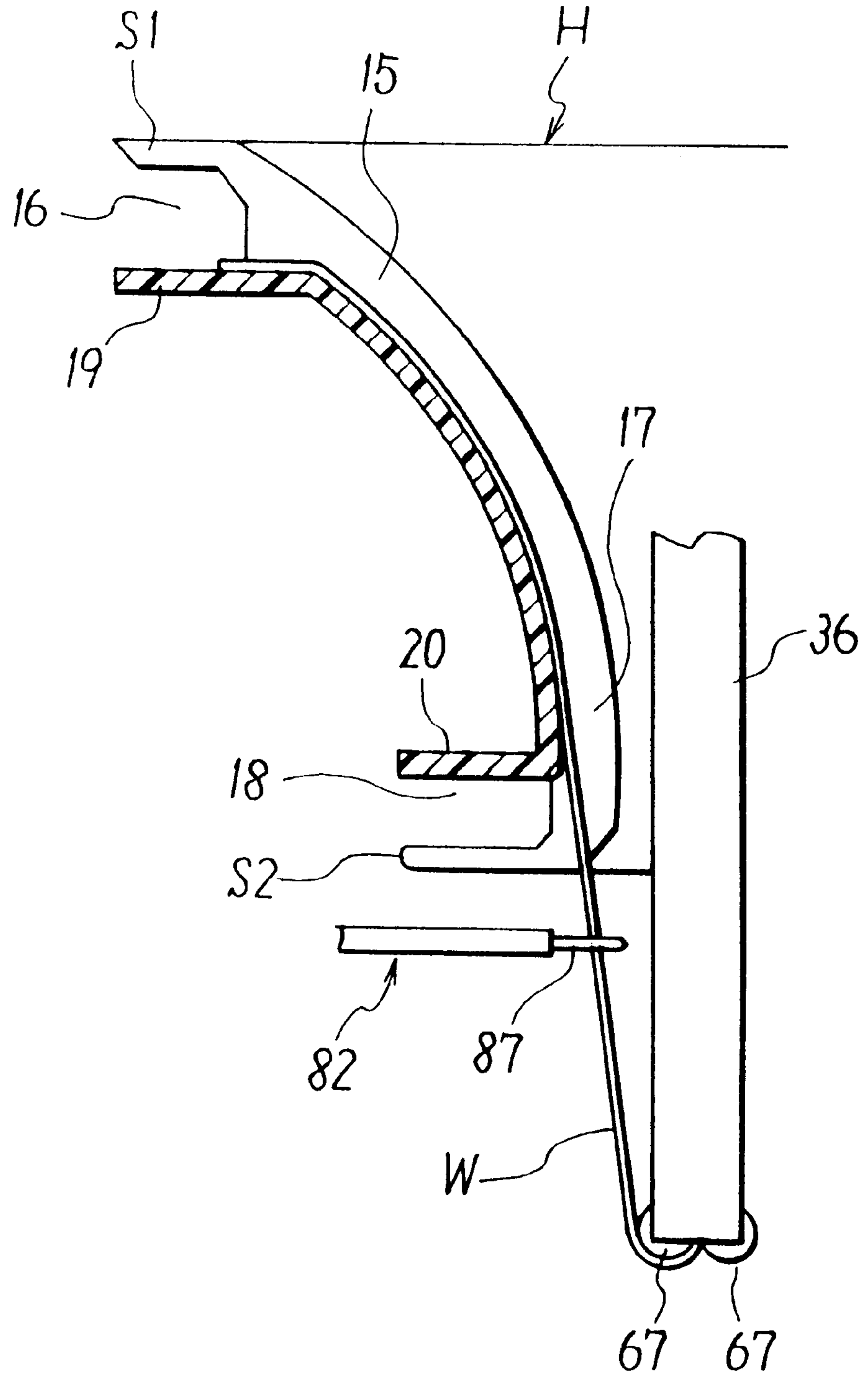
FIG. 17 is an explanatory diagram of a winding step in the embodiment.

First, as shown in FIG. 17, the nozzle 36 is brought down and the linear member W is wound along the winding grooves 15 and 17. The lower end of the nozzle 36 is projected below the neck side 14 of the deflection yoke H. In this state, the guide member 82 is positioned opposedly to the linear member W which is exposed from below the winding groove 17 to the lower end of the nozzle 36, and it is then turned to its operating position, allowing its hook 87 to be engaged with the linear member W.

Figure 18:
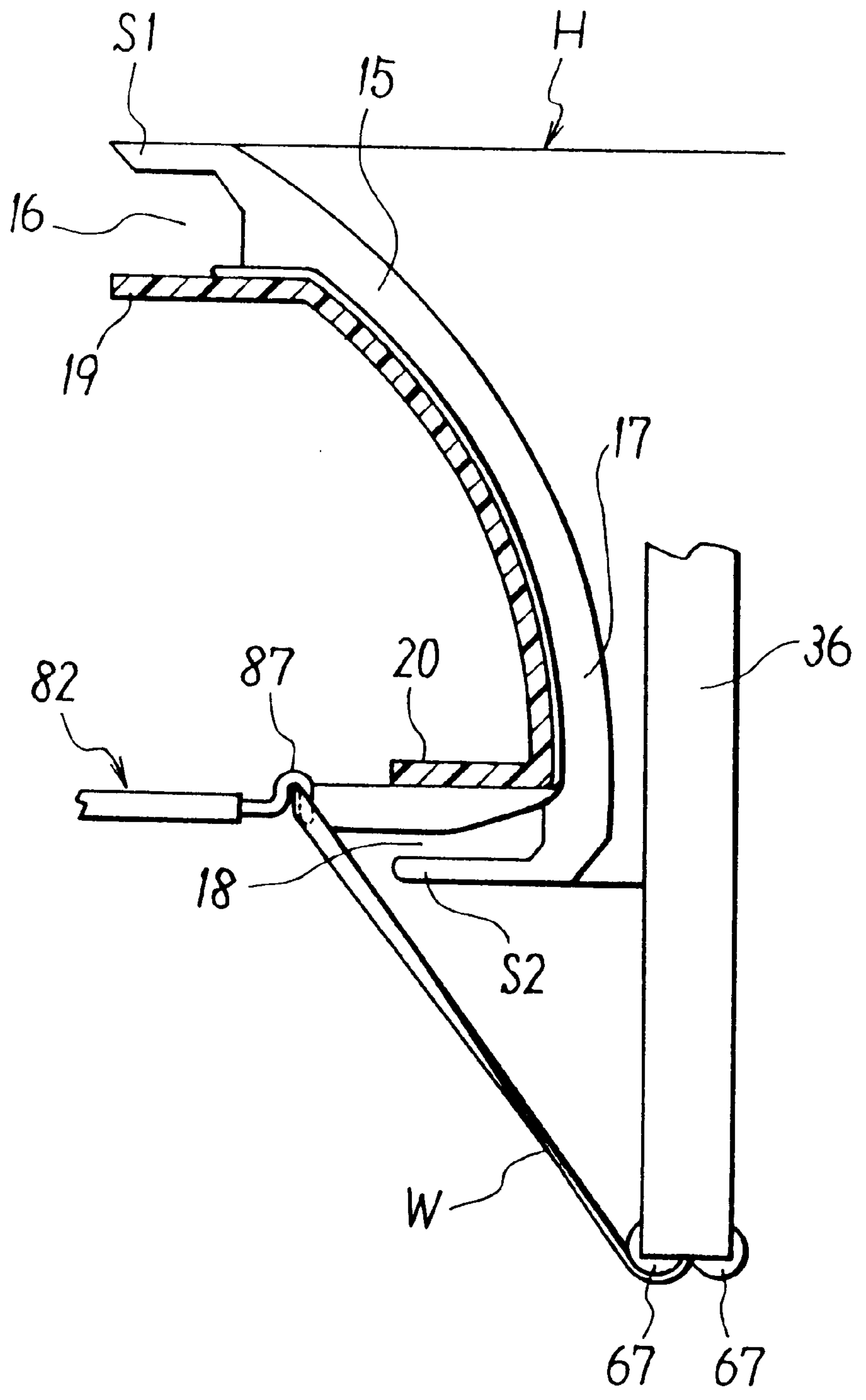
FIG. 18 is an explanatory diagram of a winding step in the embodiment.

Next, as shown in FIG. 18, the guide member 82 is retreated while pulling the linear member W and is turned 90 degrees by means of the rotary actuator 81 to twist the linear member 90 degrees so that the linear member extends along the neck-side circumferential groove 18. The guide member 82 is then raised up to the height of the groove 18. Subsequently, the deflection yoke H is rotated while the linear member W is guided by the guide member 82, allowing the linear member W to be wound round the groove 18 up to the position of the next section S2.

Figure 19:
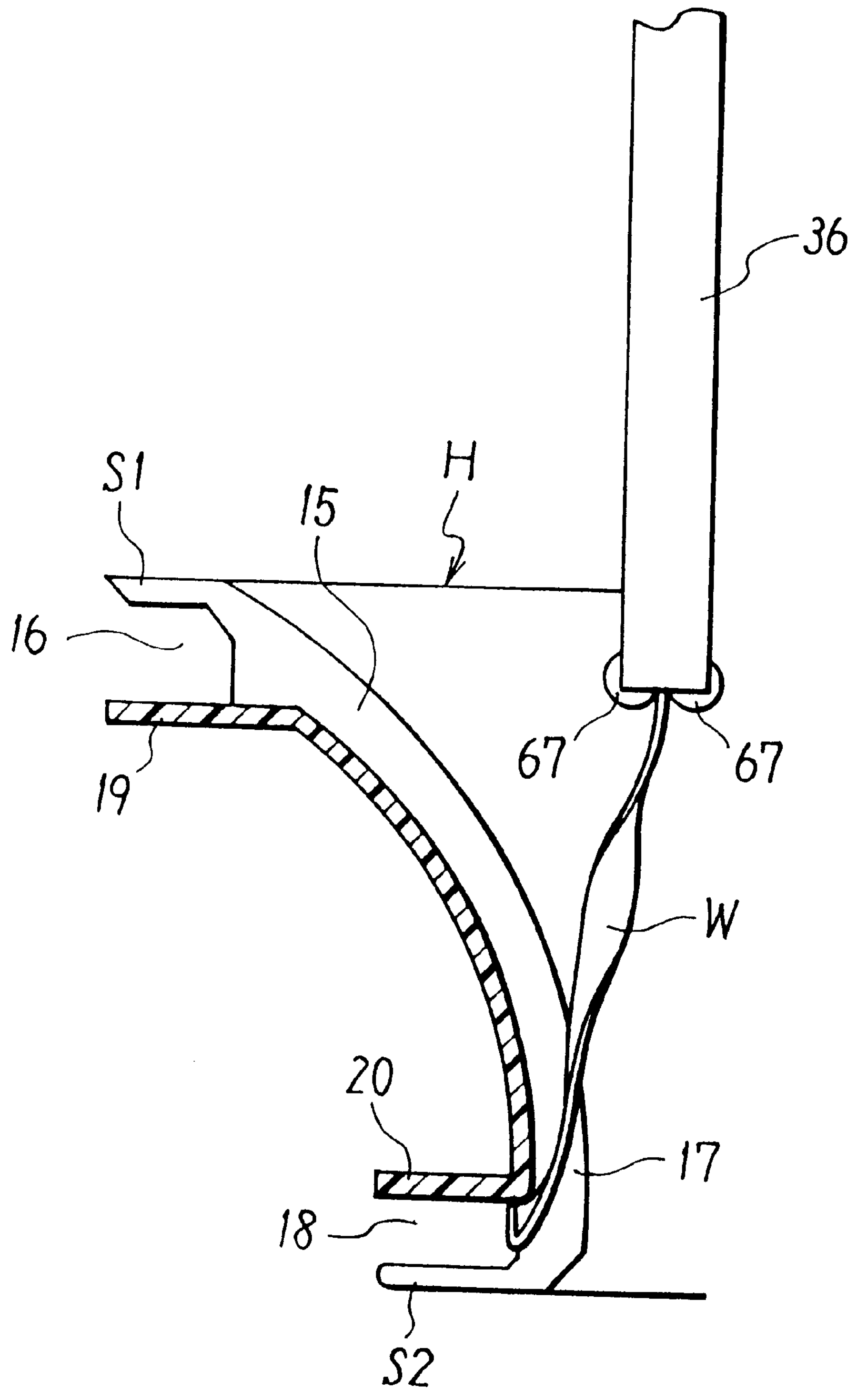
FIG. 19 is an explanatory diagram of a winding step in the embodiment.

When the linear member W has reached the section S2, the guide member 82 is further turned 90 degrees to twist the linear member by 90 degrees. At the same time, the nozzle 36 is raised to guide the linear member W to the winding groove 17. In this process, the guide member 82 turns to its retracted position and is disengaged from the linear member W. FIG. 19 shows this state, in which the linear member W which has left the nozzle 36 is in a 180 degree -twisted state.

Next, the deflection yoke H is rotated 360 degrees in the linear member untwisting direction, and at the same time the nozzle 36 is also rotated 180 degrees in the same direction as the deflection yoke H. The 360 degree rotation of the deflection yoke H results in the linear member W being twisted 180 degrees in the opposite direction, but this twist is eliminated by the 180 degree rotation of the nozzle 36 in the same direction as the deflection yoke H.

Figure 20:
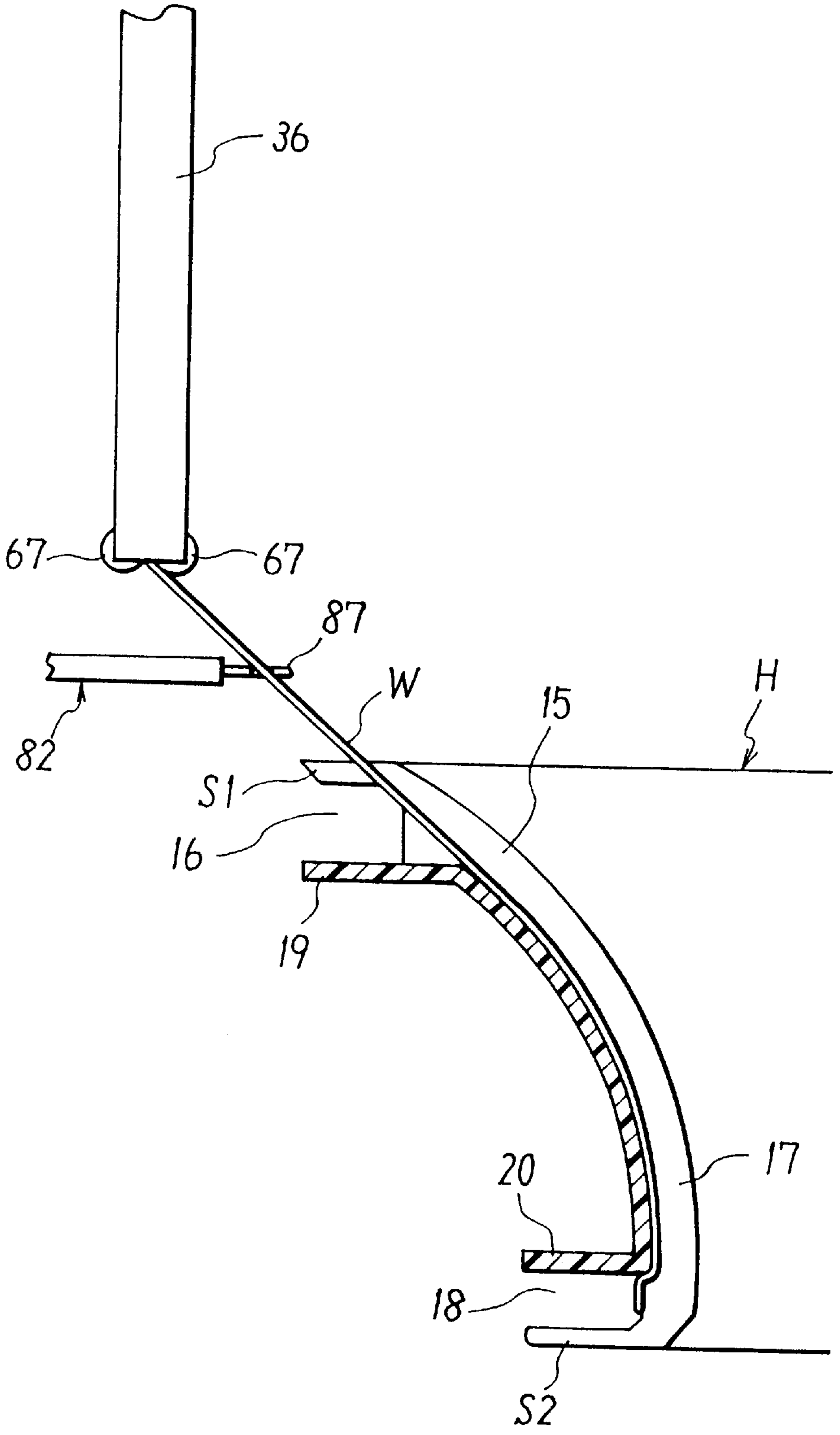
FIG. 20 is an explanatory diagram of a winding step in the embodiment.

Then, as shown in FIG. 20, the nozzle 36 is moved to the outer periphery side of the deflection yoke H while it is raised, allowing the linear member W to be wound along the winding grooves 17 and 15. In this state, the guide member 82 is again engaged with the linear member W.

Figure 21:
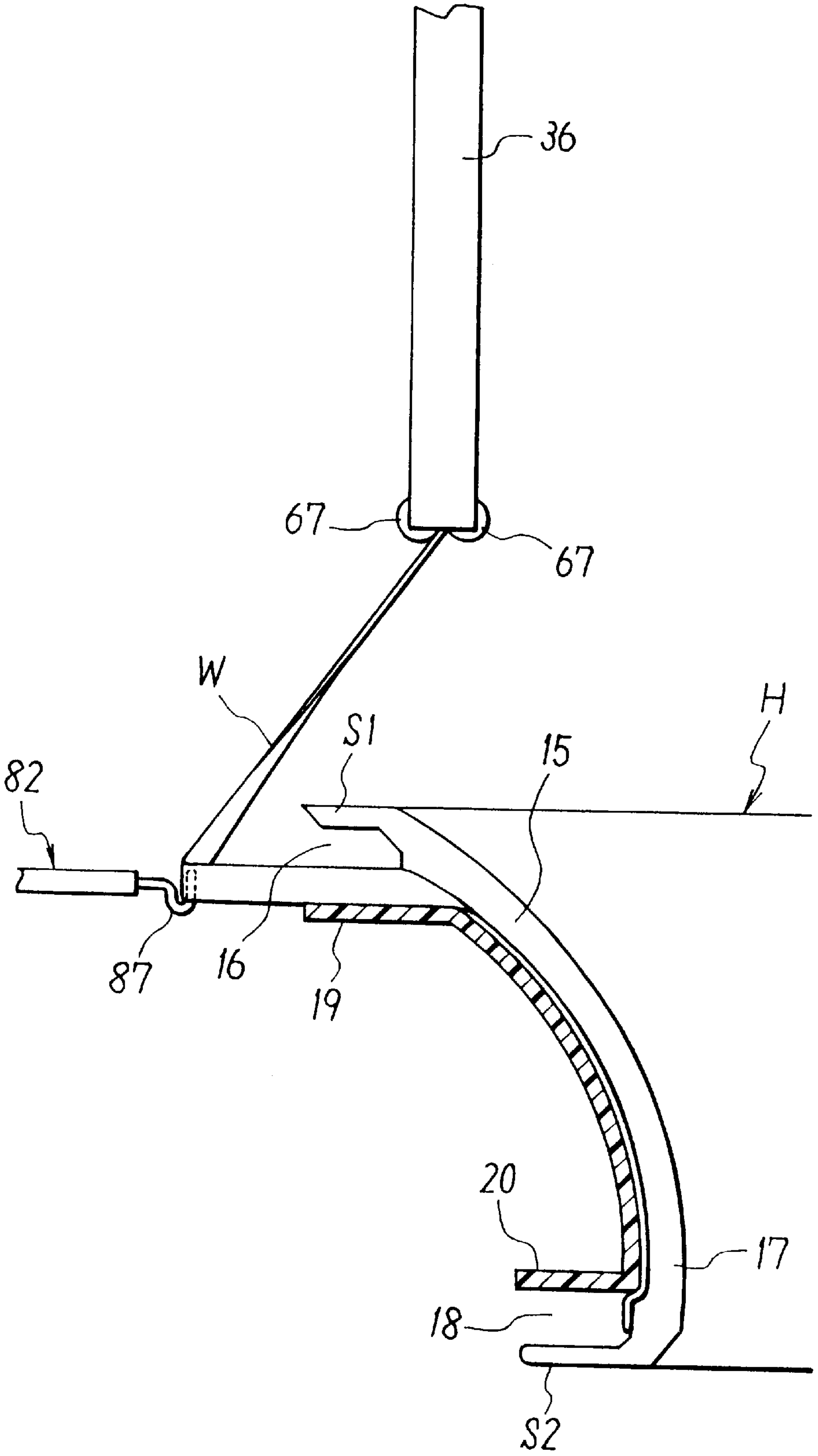
FIG. 21 is an explanatory diagram of a winding step in the embodiment.

As shown in FIG. 21, the nozzle 36 is moved to the central side of the deflection yoke H, and the guide member 82 is retreated while pulling the linear member W and is turned 90 degrees to twist the linear member 90 degrees, thus allowing the linear member to extend along the opening-side circumferential groove 16. The guide member 82 is then brought down to the height of the groove 16. Subsequently, the deflection yoke H is turned in its returning direction while the linear member is guided by the guide member 82, allowing the linear member to be wound along the opening-side circumferential groove 16 up to the position of the next section S1. At the same time, the nozzle 36 is turned 90 degrees in the direction to eliminate the 90 degree twist which has been formed by the rotation of the guide member 82.

When the linear member has reached the next section S1, the guide member 82 is further turned 90 degrees to twist the linear member 90 degrees. At the same time, the nozzle 36 is inserted into the deflection yoke H and the linear member W is guided to the winding groove 15. In this process, the guide member 82 turns to its retracted position and is disengaged from the linear member W. Further, the nozzle 36 is turned 90 degrees in the direction to eliminate the 90 degree twist of the linear member which has been formed by the rotation of the guide member 82.

In this way the linear member W is wound once round the deflection yoke H and reverts to the state shown in FIG. 17. By subsequent repetition of the above cycle the linear member W is wound along the winding path on the deflection yoke H.

The concrete motions of the nozzle 36, the guide member 82, the rotary table 96, etc. in the above embodiment are simplified illustrations for explanation and the method of the invention is not limited thereto. For example, it is possible to let the nozzle 36 perform a more complicated motion in order to facilitate the engagement and disengagement between the guide member 82 and the linear member W.

In the above embodiment, while the linear member W is wound once round the deflection yoke H, the deflection yoke is rotated 360 degrees about its axis when the linear member W sent out from the nozzle 36 has been twisted 180 degrees, and at the same time the nozzle 36 is turned 180 degrees in the same direction as the deflection yoke, then the nozzle is turned back twice by an angle of 90 degrees each time. However, this constitutes no limitation. In the method of the present invention, when the deflection yoke H is rotated 360 degrees, the nozzle 36 is turned to minimize excess twist, thereby adjusting the twist of the linear member W. In the linear member winding process, the 360 degrees rotation timing of the deflection yoke H, as well as the timing and amount of rotation of the nozzle 36, can be selected suitably.

For example, a modification may be made in such a manner that when the linear member W is first twisted 90 degrees, the nozzle 36 is turned 90 degrees in the untwisting direction, then upon subsequent 90 degree twist of the linear member, the deflection yoke H is turned 360 degrees in the untwisting direction and at the same time the nozzle 36 is turned 180 degrees in the same direction as the deflection yoke (opposite to the untwisting direction), then when the linear member W is twisted 90 degrees, the nozzle 36 is turned 90 degrees in the untwisting direction.

Figure 22A:
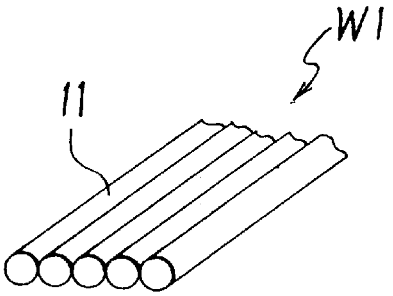
FIGS. 22A and 22B are perspective views of flat linear member assemblies.
Figure 22B:
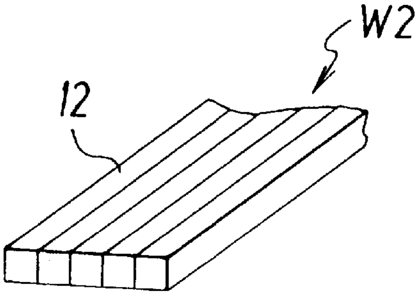

As the flat linear member, such linear member assemblies W1 and W2 as shown in FIGS. 22A and 22B, obtained by assembling a plurality of linear members into a flat shape, are employable suitably, but it goes without saying that not only such flat linear member assemblies but also a single flat linear member is employable.

The deflection yoke H is not limited to such an integral type as in the above embodiment. Even for a single deflection yoke H fabricated by combining two deflection yoke halves, winding of the linear member can be done according to the present invention.

INDUSTRIAL APPLICABILITY

As set forth above, the deflection yoke winding equipment and method of the present invention are employable as coil winding equipment and method for not only the deflection yoke used in the ordinary type of a cathode-ray tube but also to the deflection yokes used in a wide-angle deflection type cathode-ray tube and a high-frequency scan type cathode-ray tube.

I claim:

1. A winding method for a deflection yoke to be used for winding a flat linear member through first and second circumferential grooves formed in the deflection yoke and through winding grooves formed between said first and second circumferential grooves, the method using a nozzle unit having a nozzle for feeding the flat linear member and positioning means for positioning said nozzle, a guide unit having a guide member adapted to engage and guide the linear member and positioning means for positioning said guide member and a holder unit holding removably the deflection yoke for winding thereon of the flat linear member and adapted to rotate the deflection yoke about the axis of the yoke, said method comprising winding the flat linear member onto the deflection yoke held by said holder unit while said guide member engages the flat linear member at each corner portion of a winding path to bend the flat linear member, and rotating the deflection yoke 360 degrees about the axis of the yoke and turning said nozzle in the same direction as the rotating direction of the defection yoke while the linear member is wound once around the deflection yoke to prevent twisting.

2. The winding method according to claim 1, wherein while the flat linear member is wound once around the deflection yoke and when the flat linear member fed from said nozzle has been twisted 180 degrees, the deflection yoke is rotated 360 degrees about the axis thereof and the nozzle is rotated 180 degrees in the same direction as the rotating direction of the deflection yoke, thereafter the nozzle is returned to its original position from said 180 degrees rotation thereof.

3. A winding method for winding flat linear member around a deflection yoke to be wound with the flat linear member through first and second circumferential grooves formed in the deflection yoke and through winding grooves formed between said first and second circumferential grooves, said method comprising steps of:

first step for feeding said flat linear member from a nozzle in a nozzle unit and attaching an extremity of said flat linear member to the deflection yoke, said deflection yoke being held removably by a holder unit;

second step for lowering said nozzle by means of a positioning means of the nozzle thereby to wind said flat linear member along a winding groove and allowing a lower end of said nozzle to project below the deflection yoke;

third step for engaging the flat linear member exposed from the lower end of the winding groove to the lower end of said nozzle by a guide member, said guide member being positioned opposedly to said the flat linear member, retreating said guide member while pulling said flat linear member, turning said guide member 90 degrees by means of a rotating means of said guide member to twist said flat linear member, and raising said guide member up to a height of said first circumferential groove by means of a positioning member of guide member;

fourth step for rotating said deflection yoke by means of the holder unit while guiding said flat linear member by means of said guide member, thereby to allow said flat linear member to be wound around said first circumferential groove;

fifth step for further turning said guide member 90 degrees by means of said rotating means of said guide member to twist said flat linear member and, at the same time, raising said nozzle by means of said positioning means of said nozzle while turning said guide member to its retracted position and disengaging said guide member from said flat linear member;

sixth step for rotating said deflection yoke 360 degrees about an axis of the deflection yoke in a direction that said flat linear member is untwisted and, at the same time, turning said nozzle in the same direction as said deflection yoke;

seventh step for moving said nozzle to an outer periphery side of the deflection yoke while raising said nozzle above upper end of said deflection yoke, thereby to allow said flat linear member to be wound along another winding groove, and engaging again the flat linear member exposed from the upper end of said another winding groove to the lower end of said nozzle by said guide member, said guide member being raised during said sixth step, retreating said guide member while pulling said flat linear member, turning said guide member 90 degrees by means of said rotating means of said guide member to twist said flat linear member, and lowering said guide member to a height of said second circumferential groove by means of said positioning member of said guide member;

eighth step for rotating said deflection yoke by means of the holder unit against the rotational direction of deflection yoke in said fourth step while guiding said flat linear member by means of said guide member, thereby to allow said flat linear member to be wound around said second circumferential groove, and then turning said nozzle in a direction that the twist of the flat linear member formed by the rotation of guide member during said seventh step is eliminated; and ninth step for further turning said guide member 90 degrees by means of said rotating means of said guide member to twist said flat linear member and, at the same time, lowering said nozzle to insert it into said deflection yoke by means of said positioning means of said nozzle while turning said guide member to its retracted position and disengaging said guide member from said flat linear member, and then turning said nozzle in a direction that the twist of the flat linear member formed by the rotation of guide member during this step is eliminated.

4. The winding method according to claim 3, wherein when the flat linear member fed from said nozzle is twisted 180 degrees, the deflection yoke is rotated 360 degrees about the axis thereof and the nozzle is rotated 180 degrees in the same direction as the rotating direction of the deflection yoke during said sixth step, and then, in said eighth and ninth steps, the nozzle is returned respectively by 90 degrees.

5. A winding method for winding flat linear member around a deflection yoke to be wound with the flat linear member through first and second circumferential grooves formed in the deflection yoke and through winding grooves formed between said first and second circumferential grooves, said method comprising steps of:

first step for feeding said flat linear member from a nozzle in a nozzle unit and attaching an extremity of said flat linear member to the deflection yoke, said deflection yoke being held removably by a holder unit;

second step for lowering said nozzle by means of a positioning means of the nozzle, thereby to wind said flat linear member along a winding groove and allowing a lower end of said nozzle to project below the deflection yoke;

third step for engaging the flat linear member exposed from the lower end of the winding groove to the lower end of said nozzle by a guide member, said guide member being positioned opposedly to said the flat linear member, retreating said guide member while pulling said flat linear member, turning said guide member 90 degrees by means of a rotating means of said guide member to twist said flat linear member, raising said guide member up to a height of said first circumferential groove by means of a positioning member of said guide member, and then turning said nozzle in a direction that the twist of the flit linear member formed by the rotation of said guide member during this step is eliminated;

fourth step for rotating said deflection yoke by means of the holder unit while guiding said flat linear member by means of said guide member, thereby to allow said flat linear member to be wound around said first circumferential groove;

fifth step for further turning said guide member 90 degrees by means of said rotating means of said guide member to twist said flat linear member and, at the same time, raising said nozzle by means of positioning means of said nozzle while turning said guide member to its retracted position and disengaging said guide member from said flat linear member;

sixth step for rotating said deflection yoke 360 degrees about an axis of the deflection yoke in a direction that said flat linear member is untwisted and, at the same time, turning said nozzle in the same direction as said deflection yoke;

seventh step for moving said nozzle to an outer periphery side of the deflection yoke while raising said nozzle above upper end of said deflection yoke, thereby to allow said flat linear member to be wound along another winding groove, and engaging again the flat linear member exposed from the upper end of said another winding groove to the lower end of said nozzle by said guide member, said guide member being raised during said sixth step, retreating said guide member while pulling said flat linear member, turning said guide member 90 degrees by means of said rotating means of said guide member to twist said to a flat linear member, and lowering said guide member height of said second circumferential groove by means of said positioning member of said guide member;

eighth step for rotating said deflection yoke by means of the holder unit against the rotational direction of deflection yoke in said fourth step while guiding said flat linear member by means of said guide member, thereby to allow said flat linear member to be wound around said second circumferential groove; and ninth step for further turning said guide member 90 degrees by means of said rotating means of guide member to twist said flat linear member and, at the same time, lowering said nozzle to insert it into said deflection yoke by means of said positioning means of said nozzle while turning said guide member to its retracted position and disengaging said guide member from said flat linear member, and then turning said nozzle in a direction that the twist of the flat linear member formed by the rotation of guide member during this step is eliminated.

6. The winding method according to claim 5, wherein when the flat linear member fed from said nozzle is twisted 180 degrees, the nozzle is rotated 90 degree in the untwisting direction in the third step, the deflection yoke is rotated 360 degrees about the axis thereof and the nozzle is rotated 180 degrees in the same direction as the rotating direction of the deflection yoke during said sixth step, and then, the nozzle is rotated 90 degrees in the untwisting direction in said ninth steps.

* * * * *

UNITED STATES PATENT AND TRADEMARK OFFICE

CERTIFICATE OF CORRECTION

PATENT NO. : 5,988,554
DATED : November 23, 1999
INVENTOR(S) : Yoshio TAKA

It is certified that error appears in the above-identified patent and that said Letters Patent is hereby corrected as shown below:

Column 15, line 12, claim 5, line 27, change "flit" to - - flat - -

Column 16, line 6, claim 5, line 58, should read;

- - means of said guide member to twist said flat linear- -

Signed and Sealed this

Tenth Day of April, 2001

Attest:

NICHOLAS P. GODICI

*Attesting Officer* *Acting Director of the United States Patent and Trademark Office*